United States Patent
Rock et al.

(10) Patent No.: US 7,560,399 B2
(45) Date of Patent: Jul. 14, 2009

(54) MULTI-LAYER COMPOSITE FABRIC GARMENT

(75) Inventors: Moshe Rock, Brookline, MA (US); Jane Hunter, Manassas, VA (US); Charles Haryslak, Marlborough, MA (US); Gadalia Vainer, Melrose, MA (US)

(73) Assignee: MMI-IPCO, LLC, Lawrence, MA (US)

( * ) Notice: Subject to any disclaimer, the term of this patent is extended or adjusted under 35 U.S.C. 154(b) by 138 days.

(21) Appl. No.: 10/960,402

(22) Filed: Oct. 7, 2004

(65) Prior Publication Data

US 2005/0075028 A1    Apr. 7, 2005

Related U.S. Application Data

(63) Continuation-in-part of application No. 10/700,405, filed on Nov. 4, 2003, and a continuation-in-part of application No. 10/663,091, filed on Sep. 15, 2003.

(51) Int. Cl.
*B32B 5/18* (2006.01)
*B32B 27/04* (2006.01)
*D06C 11/00* (2006.01)
*A41D 1/00* (2006.01)
*A41D 3/04* (2006.01)
*A41D 13/00* (2006.01)

(52) U.S. Cl. .............. 442/76; 442/85; 442/86; 428/91; 2/69; 2/82; 2/87; 2/97

(58) Field of Classification Search ............ 442/76, 442/85, 86; 428/91; 2/69, 82, 87, 97
See application file for complete search history.

(56) References Cited

U.S. PATENT DOCUMENTS 958,879 A    5/1910 Krokert (Continued)

FOREIGN PATENT DOCUMENTS

CH    612 818    8/1979

(Continued)

OTHER PUBLICATIONS

European Search Report for EP Appl. No. 02257337 dated Feb. 5, 2003 (3 pages).

(Continued)

*Primary Examiner*—Jenna-Leigh Johnson
(74) *Attorney, Agent, or Firm*—Fish & Richardson P.C.

(57) ABSTRACT

A composite fabric garment includes a first garment portion disposed in one or more upper regions of the fabric garment, i.e. those regions relatively more likely in use to be exposed to wind and rain, and a second garment portion disposed in one or more lower regions of the fabric garment, i.e. those regions relatively less likely in use to be exposed to wind and rain. The first garment portion is formed of a first composite fabric having first inner and outer fabric layers and a first intermediate barrier layer disposed between and bonded to at least one of the first inner and outer fabric layers, the first intermediate barrier layer being breathable and substantially impermeable to wind and liquid water. The second garment portion is formed of a second composite fabric formed of second inner and outer fabric layers and having predetermined air permeability. In one embodiment, the second garment portion further includes a second intermediate, breathable, air-permeable barrier layer disposed between and bonded to at least one of the second inner and outer fabric layers. In another embodiment, the second garment portion is formed of a composite fabric having controlled air permeability in a non-laminate absent a barrier.

28 Claims, 10 Drawing Sheets

U.S. PATENT DOCUMENTS

| | | | |
|---|---|---|---|
| 2,144,514 A | 1/1939 | Spek | |
| 2,269,088 A | 1/1942 | Hanisch et al. | |
| 2,384,951 A | 9/1945 | Millar | |
| 2,404,207 A | 7/1946 | Ball | |
| 2,430,534 A | 11/1947 | Rodli | |
| 2,962,384 A | 11/1960 | Ljungbo | |
| 3,436,245 A | 4/1969 | Grundman | |
| 3,496,042 A | 2/1970 | Wyness | |
| 3,518,154 A | 6/1970 | Broadhurst | |
| 3,575,789 A | 4/1971 | Siefert et al. | |
| 3,591,401 A | 7/1971 | Snyder et al. | |
| 3,642,563 A | 2/1972 | Davis et al. | |
| 3,690,977 A | 9/1972 | Loft et al. | |
| 3,837,943 A | 9/1974 | Ploch et al. | |
| 3,906,131 A | 9/1975 | Boö | |
| 3,953,566 A | 4/1976 | Gore | |
| 3,956,530 A | 5/1976 | McKee, Jr. et al. | |
| 3,959,054 A | 5/1976 | Pietsch et al. | |
| 3,961,125 A | 6/1976 | Suminokura et al. | |
| 3,989,870 A | 11/1976 | Bocks et al. | |
| 4,018,956 A | 4/1977 | Casey | |
| 4,035,532 A | 7/1977 | Gregorian et al. | |
| 4,056,646 A | 11/1977 | Westfall et al. | |
| 4,067,209 A | 1/1978 | Kucera et al. | |
| 4,103,518 A | 8/1978 | Lombardi et al. | |
| 4,136,218 A | 1/1979 | Nischwitz et al. | |
| 4,194,041 A | 3/1980 | Gore et al. | |
| 4,241,124 A | 12/1980 | Kremer et al. | |
| 4,264,645 A | 4/1981 | von Bonin et al. | |
| 4,316,931 A | 2/1982 | Tischer et al. | |
| 4,341,213 A | 7/1982 | Cohen | |
| 4,344,999 A | 8/1982 | Gohlke | |
| 4,352,837 A | 10/1982 | Kopenhaver | |
| 4,379,189 A | 4/1983 | Platt | |
| 4,382,111 A | 5/1983 | Kuwayania et al. | |
| 4,421,809 A | 12/1983 | Bish et al. | |
| 4,433,026 A | 2/1984 | Molde | |
| 4,443,511 A | 4/1984 | Worden et al. | |
| 4,459,461 A | 7/1984 | Spencer | |
| 4,530,873 A | 7/1985 | Okada | |
| 4,533,594 A | 8/1985 | Buchanan | |
| 4,539,255 A | 9/1985 | Sato et al. | |
| 4,546,026 A | 10/1985 | Kowalski | |
| 4,560,611 A | 12/1985 | Naka et al. | |
| 4,613,544 A | 9/1986 | Burleigh | |
| 4,620,956 A | 11/1986 | Hamer | |
| 4,621,489 A | 11/1986 | Okada | |
| 4,704,112 A | 11/1987 | Suzuki et al. | |
| 4,713,068 A | 12/1987 | Wang et al. | |
| 4,733,546 A | 3/1988 | Toda | |
| 4,735,849 A | 4/1988 | Murakami et al. | |
| 4,761,324 A | 8/1988 | Rautenberg et al. | |
| 4,808,458 A | 2/1989 | Watt et al. | |
| 4,809,447 A | 3/1989 | Pacanowsky et al. | |
| 4,828,556 A | 5/1989 | Braun et al. | |
| 4,833,026 A | 5/1989 | Kausch | |
| 4,847,142 A | 7/1989 | Twilley et al. | |
| 4,868,928 A | 9/1989 | Norvell | |
| 4,883,052 A | 11/1989 | Weiss et al. | |
| 4,935,287 A | 6/1990 | Johnson et al. | |
| 4,954,388 A | 9/1990 | Mallouk et al. | |
| 4,961,985 A | 10/1990 | Henn et al. | |
| 4,970,109 A | 11/1990 | Bryant et al. | |
| 5,013,439 A | 5/1991 | Fisher et al. | |
| 5,065,600 A | 11/1991 | Byles | |
| 5,119,644 A | 6/1992 | Strauss et al. | |
| 5,126,182 A | 6/1992 | Lumb et al. | |
| 5,149,583 A | 9/1992 | Saarikettu | |
| 5,204,156 A | 4/1993 | Lumb et al. | |
| 5,268,212 A | 12/1993 | Lumb et al. | |
| 5,283,112 A | 2/1994 | Krishnan | |
| 5,312,667 A | 5/1994 | Lumb et al. | |
| 5,364,678 A | 11/1994 | Lumb et al. | |
| 5,389,430 A | 2/1995 | Yilgor et al. | |
| 5,415,924 A * | 5/1995 | Herlihy, Jr. | 442/35 |
| 5,474,824 A | 12/1995 | Martakos et al. | |
| 5,520,022 A | 5/1996 | Callaway | |
| 5,526,532 A | 6/1996 | Willard | |
| 5,529,830 A | 6/1996 | Dutta et al. | |
| 5,547,733 A | 8/1996 | Rock et al. | |
| 5,557,950 A | 9/1996 | Richards et al. | |
| 5,598,615 A | 2/1997 | Takada | |
| 5,636,533 A | 6/1997 | Hunneke et al. | |
| 5,695,868 A | 12/1997 | McCormack | |
| 5,718,000 A | 2/1998 | Ost et al. | |
| 5,756,180 A | 5/1998 | Squires et al. | |
| 5,817,391 A | 10/1998 | Rock et al. | |
| 5,906,876 A | 5/1999 | Conway | |
| 6,018,819 A * | 2/2000 | King et al. | 2/69 |
| 6,082,147 A | 7/2000 | Rock et al. | |
| 6,164,095 A | 12/2000 | Rock et al. | |
| 6,258,308 B1 | 7/2001 | Brady et al. | |
| 6,263,511 B1 | 7/2001 | Moretti | |
| 6,308,344 B1 | 10/2001 | Spink | |
| 6,439,002 B1 | 8/2002 | Driggars | |
| 6,511,927 B1 | 1/2003 | Ellis et al. | |
| 6,524,978 B1 | 2/2003 | Moore | |
| 2002/0059674 A1 | 5/2002 | Blauer et al. | |
| 2002/0124365 A1 | 9/2002 | Wood et al. | |
| 2003/0104735 A1 | 6/2003 | Rock | |
| 2004/0132367 A1 | 7/2004 | Rock | |
| 2005/0015843 A1* | 1/2005 | Roux et al. | 2/69 |

FOREIGN PATENT DOCUMENTS

| | | |
|---|---|---|
| DE | 7533844 | 7/1976 |
| DE | 2 737 756 | 1/1979 |
| DE | 30 43 433 | 7/1982 |
| DE | 35 33 535 | 4/1987 |
| EP | 0081850 A2 | 6/1983 |
| EP | 0081850 B1 | 6/1983 |
| EP | 0 111 409 | 6/1984 |
| EP | 0 515 206 | 11/1992 |
| EP | 0 969 130 | 1/2000 |
| EP | 1 067 226 A2 | 1/2001 |
| EP | 1312710 A1 | 5/2003 |
| FR | 1 477 810 | 4/1965 |
| FR | 2131852 A1 | 11/1972 |
| FR | 2 313 486 | 12/1976 |
| FR | 2 402 381 | 3/1979 |
| FR | 2 512 081 | 3/1983 |
| FR | 2 747 133 | 10/1997 |
| GB | 1 321 643 | 7/1971 |
| GB | 1 260 462 | 1/1972 |
| GB | 1 420 497 | 1/1976 |
| GB | 2 106 153 | 7/1983 |
| GB | 2 263 225 | 7/1993 |
| JP | 39561 | 2/1986 |
| JP | 63297516 | 6/1990 |
| JP | 2000239906 A | 9/2000 |
| WO | WO96/09165 | 3/1996 |
| WO | WO 00/13889 | 3/2000 |
| WO | WO 00 44969 | 8/2000 |

OTHER PUBLICATIONS

European Search Report; EP 04 25 4668; The Hague; Nov. 3, 2004; P. VanGelder.

European Search Report; EP 04 25 5593; Dec. 20, 2004, The Hague, P. VanGelder.

Canadian Journal of Research; OL. 25, Sec. A; Jul. 1974; No. 4; "The Effect of Wing on the Thermal Resistance of Clothing . . . Various Permeabilities"; P. Larose; pp. 169-190.

"Standard Test Method for Air Permeability of Textile Fabrics"; ASTM Designation: D737-96; pp. 230-234.

International Search Report; EP 03 25 2366; Sep. 2003; P. Van Gelder.

Patent Abstracts of Japan; vol. 1998, No. 03, Feb. 27, 1998; JP 09 302560; Nov. 25, 1997.

European Search Report; EP 02 25 7260; D. Sterle; Jan. 15, 2003.

Patent Abstracts of Japan; vol. 015, No. 173 (C-0828); May 2, 1991 & JP 03 040845 A; Feb. 21, 1991.

Patent Abstracts of Japan; vol. 1995, No. 11, Dec. 26, 1995 & JP 07 197354 A; Aug. 1, 1995.

Adanur, Sabit Ph.D., Wellington Handbook of Industrial Textiles; Technomic Publishing Co., Inc.; pp. 176-177, 597-599.

"Standard Test Method for Air Permeability for Textile Fabrics"; ASTM Designation; D737-96; pp. 230-234.

Anonymous, "Marmot Alpine Jacket 3136", Internet Article, Dec. 11, 2002, web.archive.org/web/20021121102533/http://www.epinions.com/otdr-Apparel-A11-Marmot_Alpine_Jacket_3136, 4 pages.

Anonymous, "2003 Mammut", Seon, p. 12, 2003.

Anonymous, "Patagonia-Herbst Winter 2004", Patagonia catalog, p. 10, Sep. 2004.

Knecht, "Funktionstextilien", Deutscher Fachverlag, Frankfurt, pp. 147-149, 156, 157, and 163-172, 2003.

\* cited by examiner

MULTI-LAYER COMPOSITE FABRIC GARMENT

CROSS-REFERENCE TO RELATED APPLICATIONS

This application is a continuation-in-part of U.S. application Ser. No. 10/700,405, filed Nov. 4, 2003, now pending. This application is also a continuation-in-part of U.S. application Ser. No. 10/663,091, filed Sep. 15, 2003. The complete disclosures of both of these applications are incorporated herein by reference.

TECHNICAL FIELD

This invention relates to garments, and in particular to garments formed of multi-layer composite fabric.

BACKGROUND

Composite fabric articles are achieved by joining together one or more materials in a fabric body for the purpose of attaining desirable properties that cannot be attained by the fabric body or the individual materials alone. Laminated composites, e.g., those having multiple layers joined, e.g., by an adhesive, are sometimes formed for increasing thermal resistance performance of a composite fabric body.

Composite fabrics can be designed for wind and/or liquid water resistance. Composite fabrics of this type typically include a barrier membrane adhered to one fabric layer, or adhered or placed between fabric layers. The barrier membrane of such composite fabrics may be constructed to resist, or substantially impede, passage of air and wind through the fabric layers. However, this type of construction can make it difficult for water vapor to escape outwardly through the barrier, causing liquid to build up on the wearer's skin, with resulting discomfort, in particular during exercise or other physical exertion.

Other composite fabrics are designed to enhance water vapor permeability and airflow in order to improve comfort level for the wearer during physical activity. These fabrics, however, are typically poor insulators, and, as a result, during static physical conditions, i.e. when at or near rest, the wearer may experience discomfort due to flow of cool air through the fabric.

SUMMARY

According to the invention, a composite fabric garment comprises a first garment portion disposed in one or more upper regions of the fabric garment, i.e. those regions relatively more likely in use to be exposed to wind and rain, and a second garment portion disposed in one or more lower regions of the fabric garment, i.e. those regions relatively less likely in use to be exposed to wind and rain. The first garment portion is formed of a first composite fabric comprising a first inner fabric layer, a first outer fabric layer, and a first intermediate barrier layer disposed between and bonded to at least one of the first inner fabric layer and the first outer fabric layer. The first intermediate barrier layer is breathable and substantially impermeable to wind and liquid water. The second garment portion is formed of a second composite fabric having predetermined air permeability and comprising, at least, a second inner fabric layer and a second outer fabric layer.

Preferred embodiments of the invention may include one or more of the following additional features. Lower regions of the fabric garment include a wearer's lower chest region and below. At least one of the first inner fabric layer and the second inner fabric layer comprises yarn with a plurality of synthetic fibers rendered hydrophilic. Preferably, the synthetic fibers of at least one of the first inner fabric layer and the second inner fabric layer rendered hydrophilic are selected from the group consisting of polyester and nylon. The first intermediate barrier layer comprises a first hydrophilic layer bonded to at least one of the first inner fabric layer and the first outer fabric layer by transfer coating from a carrier without a separate adhesive, the first intermediate barrier layer permitting moisture vapor transmission (MVT). Preferably, the first intermediate barrier layer further includes a second hydrophilic barrier layer disposed on and adhered to the other of the first inner fabric layer and the first outer fabric layer by transfer coating from a carrier without a separate adhesive, the first hydrophilic layer and the second hydrophilic layer being adhered together. More preferably, the first hydrophilic layer and the second hydrophilic layer are adhered together with adhesive. Preferably, the first hydrophilic layer is bonded to at least one of the first inner fabric layer and the first outer fabric layer by a discontinuous adhesive layer. The first inner fabric layer is hydrophilic. The first outer fabric layer is hydrophobic. At least one of the first inner fabric layer and the second inner fabric layer defines a surface comprising discrete pillar regions of relatively deeper pile, the discrete pillar regions of relatively deeper pile being spaced apart and isolated from each other by regions of relatively shorter pile or no pile that form a plurality of channels passing among the discrete pillar regions, the plurality of channels defining insulation regions to contain a cushion of air for promoting warmth under static conditions during periods of wearer inactivity and defining circulation regions creating avenues for flow of air and enhanced evaporation of moisture from the skin of the wearer for creating a heat dissipation or cooling effect during periods of physical activity by the wearer. Preferably, the plurality of channels formed along at least one of the first inner fabric layer and the second inner fabric layer comprises a plurality of intersecting vertical and horizontal channels. More preferably, the vertical channels formed along at least one of the first inner fabric layer and the second inner fabric layer are constructed by tipped and tipless sinkers, high and low sinkers, or a combination thereof. At least one of the first outer fabric layer and the second outer fabric layer comprises a knit construction of multi-filament, interlaced yarns with one or more outer surface regions having a non-continuous coating comprising discrete coating segments of coating material applied to bind individual yarn fibers together for enhanced resistance of the outer surface region to abrasion, pilling or fraying. At least one of the first inner fabric layer and the second inner fabric layer has a raised surface in a form selected from the group consisting of: velour, shearling, and loop terry. At least one of the first outer fabric layer and the second outer fabric layer has a construction selected from the group consisting of: woven construction, circular knit construction, single face knit construction, double face knit construction, and warp knit construction. Preferably, at least one of the first outer fabric layer and the second outer fabric layer has one-way stretch or two-way stretch. At least one of the first outer fabric layer and the second outer fabric layer has a raised surface and/or an unraised surface in one or more regions. In the upper portion of the composite fabric garment, at least the outer layer has a construction with minimal seams for improved resistance to penetration of water. The outer surface region of non-continuous coating is limited to one or more discrete regions of the outer surface and one or more other outer surface regions are substantially free of coating material. The outer surface region of non-continuous coating is limited to one or more discrete regions of the outer surface and one or more other outer surface regions have a continuous coating. The discrete regions and the other outer surface regions have contrasting resistance to abrasion and/or to pilling or fraying. The discrete regions and the other outer surface regions have contrasting air permeability. The discrete coating segments of coating materials comprise discrete dots. The coating material is selected from the group consisting of acrylic latex, polyurethane and silicone. The discrete regions correspond to regions of the garment typically subjected to relatively higher levels of abrasion and pilling or fraying during use. At least one of the first outer fabric layer and the second outer fabric layer comprises a fabric of knitted or woven construction of multi-filament, interlaced yarns with one or more outer surface regions having a non-continuous coating of binder material adhered to yarns and to yarn fibers at least at interlacing intersections for enhanced durability performance of the outer surface region against pilling or fraying during use. The multi-filament yarns comprise fibers formed of materials selected from the group consisting of polyester, nylon and polypropylene. Adhering of the binder material to yarn fibers is limited in a manner to substantially avoid restriction of air permeability through the composite fabric garment. The first inner fabric layer comprises a raised inner surface and a plain outer surface, the first inner fabric layer being formed of essentially hydrophobic material rendered hydrophilic to permit wicking of moisture from the raised inner surface to the plain outer surface, and wherein the first intermediate barrier layer comprises a first hydrophilic layer bonded to at least one of the first inner fabric layer and the first outer fabric layer, the first intermediate barrier layer permitting water vapor transport. The first intermediate barrier layer comprises a second hydrophilic layer disposed upon and adhered to the other of the first inner fabric layer and the first outer fabric layer, the first hydrophilic layer and the second hydrophilic layer being adhered together. The first intermediate barrier layer is essentially non-porous. The first intermediate barrier layer comprises hydrophilic polyurethane. The first outer fabric layer is hydrophobic. The first hydrophilic layer is bonded to at least one of the first inner fabric layer and the first outer fabric layer by a discontinuous adhesive layer. The first inner fabric layer comprises a raised inner surface and a plain outer surface, the first inner fabric layer being formed of essentially hydrophilic material to permit wicking of moisture from the raised inner surface to the plain outer surface, and wherein the first intermediate barrier layer comprises a non-porous hydrophilic layer, the first intermediate barrier layer permitting water vapor transport, and wherein a first hydrophilic adhesive layer affixes the first intermediate barrier layer to at least one of an outer surface of the first inner fabric layer and an inner surface of the first outer fabric layer. The first hydrophilic adhesive layer is continuous. The first hydrophilic adhesive layer affixes the first intermediate barrier layer to the outer surface of the first inner fabric layer, and a second hydrophilic adhesive layer affixes the first intermediate barrier layer to the inner surface of the first outer fabric layer. The second hydrophilic adhesive layer is continuous. The first intermediate barrier layer further comprises a second hydrophilic layer disposed upon and adhered to the first hydrophilic layer, the first hydrophilic layer being disposed upon and adhered to the first inner fabric layer, and the second hydrophilic layer being disposed upon and adhered to the first outer fabric layer, the first adhesive layer joining the first hydrophilic layer to the first inner fabric layer, and a second adhesive layer joining the second hydrophilic layer to the first outer fabric layer. The second adhesive layer is continuous. The first intermediate barrier layer is formed of essentially non-porous hydrophilic material. The second garment portion has a velour/velour construction selected from the group consisting of: woven construction, circular knit construction and warp knit construction, with predetermined air permeability, e.g. in the range of about 0 CFM to about 100 CFM, achieved in a non-laminate absent an intermediate barrier. The second garment portion further comprises a second intermediate, breathable, air-permeable barrier layer disposed between and bonded to at least one of the second inner fabric layer and second outer fabric layer. Preferably, the second intermediate, breathable, air-permeable barrier layer having predetermined air permeability, e.g. in the range of about 0 CFM to about 20 CFM, is selected from the group consisting of foamed adhesive in a discontinuous film, adhesive in a continuous film mechanically altered by a process of crushing and stretching, breathable adhesive in a discontinuous film, and wherein the predetermined air permeability of the second intermediate, breathable, air-permeable barrier layer is selected to allow air flow between the second inner fabric layer and the second outer fabric layer, and wherein the second intermediate, breathable, air-permeable barrier layer has a variable level of water vapor diffusion resistance that substantially decreases with increase in air speed of moving air impinging on the second composite fabric. The second intermediate, breathable, air-permeable barrier layer comprises an adhesive selected from the group consisting of an adhesive in the form of a mechanically altered breathable continuous film and a foamed breathable adhesive in the form of a discontinuous film. The second intermediate, breathable, air-permeable barrier comprises foamed adhesive in the form of a discontinuous film. The second intermediate, air-permeable vapor barrier comprises a breathable membrane disposed between the first fabric layer and the second fabric layer and adhered thereto with an adhesive. The breathable membrane is formed of a material selected from the group consisting of polyurethane, acrylic, polytetrafluoroethylene, polyester and combinations thereof. The breathable membrane comprises a membrane mechanically altered by a process of controlled stretching. The adhesive is selected from the group consisting of polyurethane, acrylic, polyamide, polyester and combinations thereof.

The disclosures of the following applications are incorporated herein by reference: U.S. application Ser. No. 10/047,939; U.S. application Ser. No. 10/650,098; U.S. application Ser. No. 09/378,344; U.S. Provisional application No. 60/098,254; U.S. application Ser. No. 10/650,098; U.S. application Ser. No. 09/863,852; U.S. application Ser. No. 10/341,309; U.S. application Ser. No. 10/122,024; U.S. Application Ser. No. 09/982,720; U.S. application Ser. No. 09/883,643; and U.S. application Ser. No. 09/347,825.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
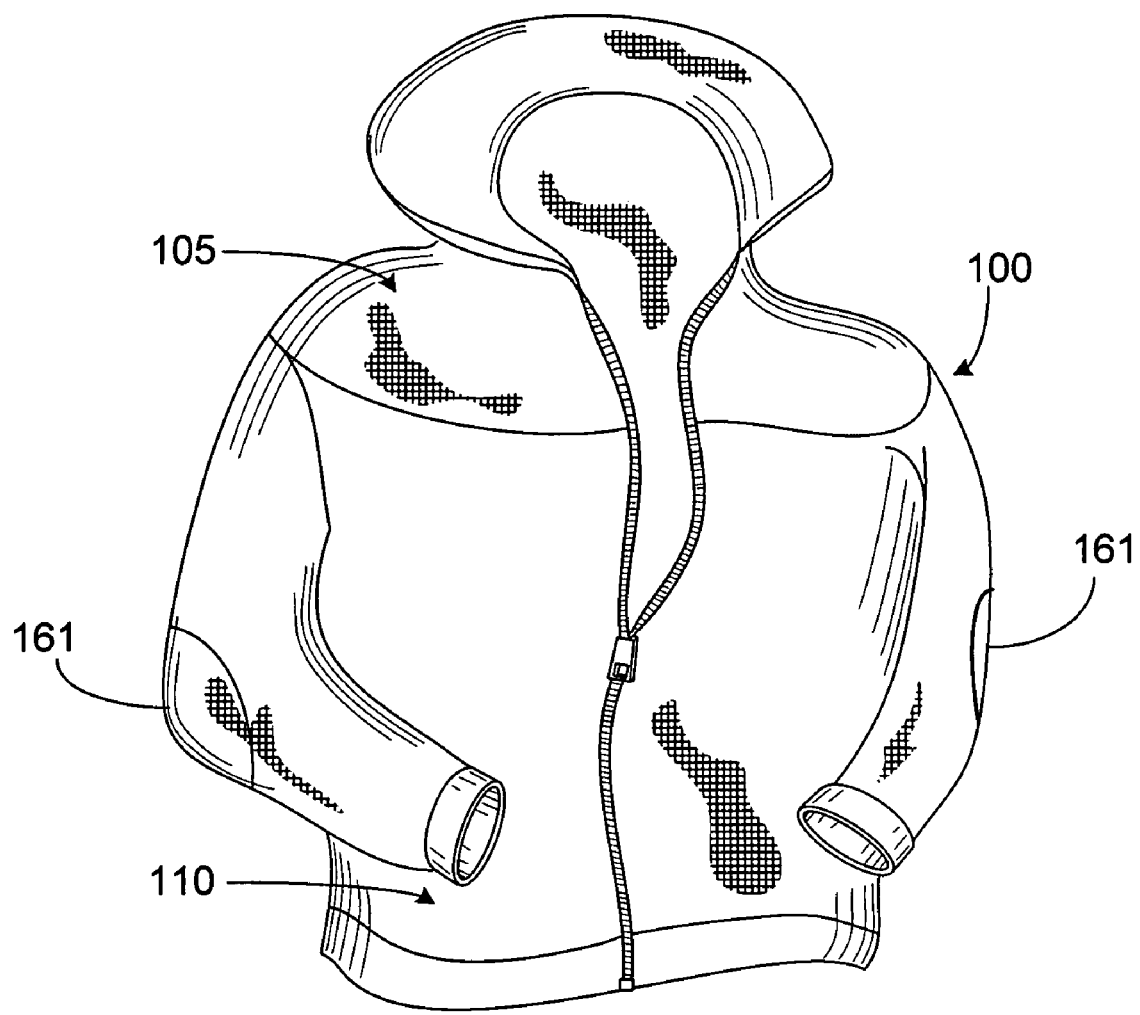
FIG. 1 is a front view of an example of a multi-layer composite fabric garment of the invention.
Figure 2:
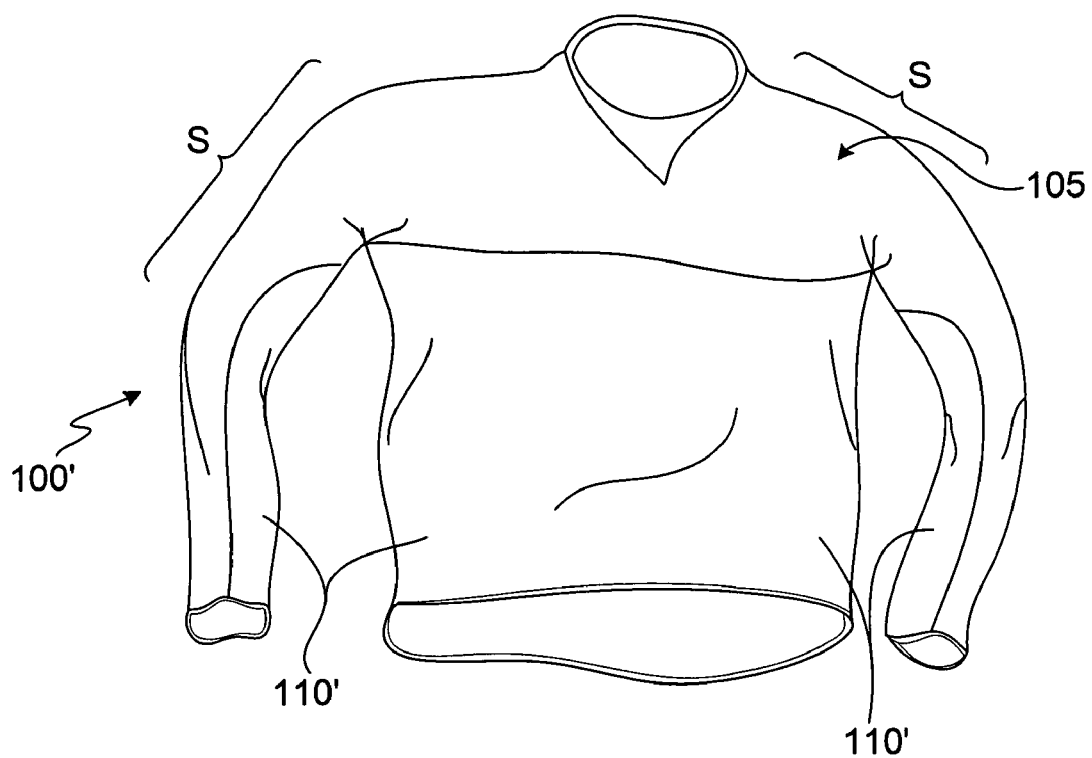
FIG. 2 is a front view of another example of a multi-layer composite fabric garment of the invention.

Referring to FIGS. 1 and 2, multi-layer composite fabric garments 100, 100' of the invention have an upper portion 105 and lower portions 110, 110', respectively. In each embodiment, the upper portion 105 is formed of a laminate consisting of an inner fabric layer and an outer fabric layer, with an intermediate barrier layer disposed therebetween. In preferred embodiments, the outer fabric is stretch woven with two-way stretch (length and width directions) and laminated to single face velour with a small box pile pattern of intersecting channels on the inner surface. The intermediate barrier is a moisture permeable film, e.g. porous hydrophobic or full film hydrophilic. This construction provides a composite fabric with very good hydrostatic resistance (almost waterproof) properties. It also provides high resistance to penetration of wind (air), with relatively low CFM, e.g. in the range of about 0 CFM to about 1 CFM, for enhanced thermal insulation in dynamic conditions. In the upper portion of the garment, at least the outer layer is constructed with no seams, or at least a bare minimum number of seams, for improved resistance to penetration of water with little of no sealing of seams.

In the embodiment of FIG. 1, the lower portion 110, extending, e.g. over the lower region of the chest and below, is formed of an inner fabric layer and an outer fabric layer, with an intermediate, air-permeable barrier layer, e.g. crushed adhesive, discontinuous adhesive, foamed adhesive, or the like, disposed therebetween. This construction is adapted to provide a controlled, somewhat higher level of water vapor and air permeability, e.g. in the range of about 0 CFM to about 20 CFM (ASTM D-737).

In the embodiment of FIG. 2, the lower portion 110' is formed of an inner fabric layer and an outer fabric layer (i.e. without an intermediate barrier layer). This construction is employed to provide a controlled, relatively higher level of water vapor and air permeability, e.g. in the range of about 0 CFM to about 100 CFM (ASTM D-737). The fabric of lower portion 110' can be selected from among, e.g., woven construction having one-way stretch, with or without raised surface; woven construction having two-way stretch, with or without raised surface; knit construction (circular, single face, double face, single face with hard surface (described below), etc.) with one-way stretch; knit construction (circular, single face, double face, single face with hard surface, etc.) with two-way stretch; and warp knit construction with one-way or two-way stretch. The inner layer may be worn, e.g., as a thermal insulation layer or as a first layer, i.e. as underwear or as expedition weight wear.

Referring still to FIG. 2, composite fabric elements of the upper and lower portions are stitched together in a predetermined pattern to form a composite fabric garment 100' of the invention, with a bare minimum number of seams (both for wearer comfort (i.e. less chafing) and to reduce shortening of a garment's useful life due, e.g. to wearing and ripping of seams), and, in at least the upper portion, to improve resistance to penetration of water without sealing of seams. In particular, in a composite fabric garment 100', the upper portion 105 of covers the shoulder regions, S, and extends below the elbows down over the entire lengths of the arms. The lower portion 110' of the composite fabric garment extends about the body from the chest region down to the waist. This arrangement provides enhanced air circulation over regions of the body that produce excessive heat during periods of high activity. The sleeves are divided into two separate regions, with the lower or under portions of the sleeves extending from the armpits down along the undersides of each arm to the wrist. This arrangement allows the body's natural cooling system additional control by permitting cooling close to the arteries of the arm while preventing heat loss due to wind chill in the upper or topside portion of the sleeve. The pattern designs of the respective upper and lower portions of the multi-layer composite fabric garments 100, 100' are not limited to the particular combinations shown in the drawings and described herein; rather, a wide variety of different patterns can be employed in order to achieve the desired results with optimum performance. For example, in another embodiment (not shown), the upper portion 105 of the composite fabric garment may completely cover the surface of the garment except in high perspiration regions of the body, i.e., under the arms. More extensive coverage by the upper portion 105 can produce a garment offering enhanced resistance in extremely wet and windy environments. The upper portion and/or the lower portion of multi-layer composite fabric garments of the invention may be provided with one-way or two-way stretch, e.g. by incorporation of spandex material in the inner and/or outer fabric layers. The inner layers of the upper and lower portions are finished with raised surfaces, e.g. in a three-dimensional pattern with raised regions separated by channels or with velour at predetermined pile height, shearling, loop terry, etc.

As a result of the combinations of features of construction and materials described briefly above, and in more detail below, multi-layer composite fabric garments of the invention protect a wearer with a relatively high degree of resistance to penetration of liquid water and wind in areas of the garment that are relatively more likely to be exposed to rain and wind, while at the same time, the composite fabric garment also provides a relatively higher degree of water vapor permeability and controlled air flow in areas that are relatively less likely to be exposed to rain and wind. The multi-layer composite fabric garments of the invention thus provide a wearer with an increased overall level of comfort, e.g. as compared to prior art garments of similar design.

Features and advantages of multi-layer composite fabric garments of the invention will now be described in more detail.

Upper Portion of the Garments

Referring still to FIGS. 1 and 2, the upper portion 105 of multi-layer composite fabric garments 100, 100' includes the shoulder regions, S, of the garment. During use, the shoulder regions are frequently exposed to rain and wind, thus the liquid water resistance and the wind resistance provided by the constructions of the upper portion 105 of fabric garments of the invention have particular importance to enhancing and maintaining a wearer's comfort. In other embodiments, the upper portion 105 may additionally or instead encompass various other regions of the garments, in particular, those regions relatively more likely to be exposed to wind and rain. For example, the upper portion may include the sleeve regions, the upper back region, and/or upper regions of the front of the garments. Finally, while the garments depicted in FIGS. 1 and 2 are a jacket and a jersey, respectively, it should be noted that the invention relates to multi-layer composite fabric garments of any of the various types of clothing articles, including, but not limited to, coats, shells, pullovers, vests, shirts, pants, etc.

Figure 3:
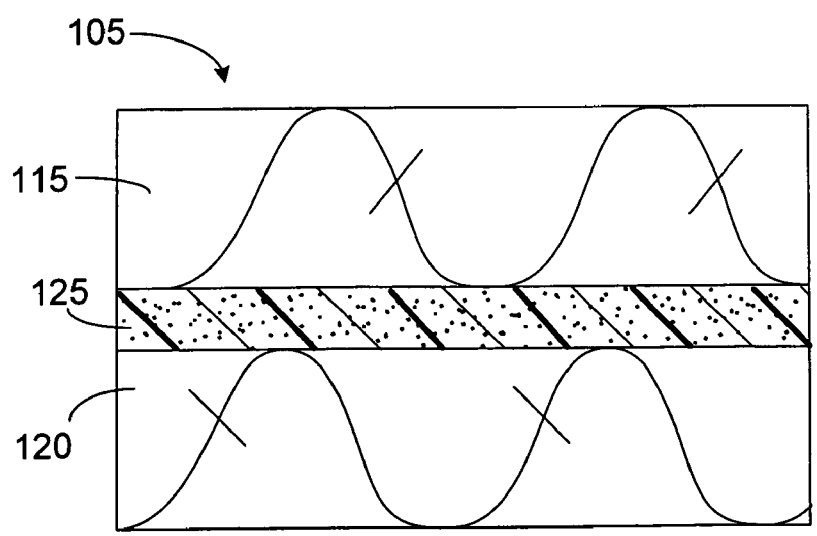
FIG. 3 is a cross-sectional view of an example of a multi-layer composite fabric for use in an upper portion of multi-layer fabric garments of the invention.

Referring to FIG. 3, the upper portion 105 is formed of a multi-layer composite fabric consisting of an outer fabric layer 115, an inner fabric layer 120 (worn towards a wearer's skin), and an intermediate barrier layer 125 positioned between and adhered to the inner and outer fabric layers 115, 120. Due to the construction of the multi-layer composite, which is described in more detail below, the upper portion 105 is resistant to penetration by liquid water and wind. For example, as mentioned above, the laminate of the upper portion of the composite fabric garment permits only a relatively low volume of air flow, e.g. in the range of about 0 to about 1 CFM (cubic feet per minute), for enhanced thermal insulation performance in dynamic, i.e. windy, conditions. The laminate of the upper portion also has very good hydrostatic resistance, e.g. in the range of about 20 cm W.C. (centimeters of water column) to about 1,000 cm W.C., as established according to test method ASTM-D-751 procedure B. The outer fabric layer 115 also has very good water repellence rating, e.g. in the range of about 90 to about 100, as established according to test method AATCC22-1980, and very good resistance rating to pilling, e.g. in the range of about 4 to about 5, as established according to test method ASTM-D-3512, all as described in more detail below. The complete disclosures of all of the listed test methods are incorporated herein by reference.

During use, the inner fabric layer 115 of the upper portion 105 absorbs liquid moisture, e.g., sweat, which it then transports on a molecular level to and through the barrier layer 125 and through the outer fabric layer 120, to the outer surface, where the moisture evaporates.

Figure 4:
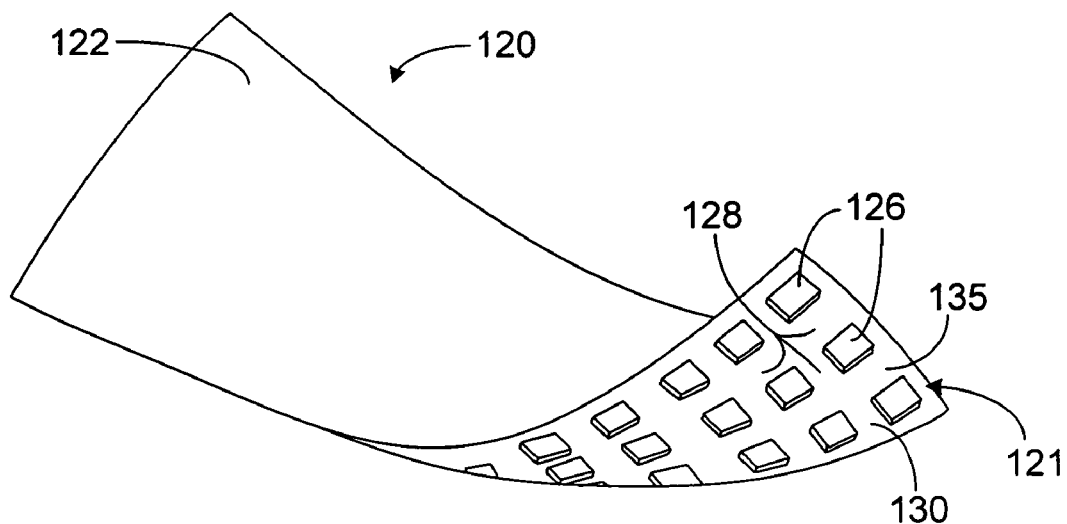
FIG. 4 is a somewhat diagrammatic perspective view of the inner surface of an inner fabric layer of an example of a multi-layer composite fabric for use in an upper portion of multi-layer composite fabric garments of the invention.

Referring to FIG. 4, the inner fabric layer 120, which may be formed, e.g., of a yarn that includes multiple fibers of polyester, nylon, or other synthetic fabric that have been rendered hydrophilic, has an inner surface 121 (worn towards or against the wearer's skin) and an outer surface 122. In one preferred embodiment, the inner surface 121 defines a pattern of discrete pillar regions 126 of relatively deeper pile, which are spaced apart and isolated from each other by regions 128 of relatively shorter pile or no pile that form a plurality of intersecting channels 130, 135 passing among the discrete pillar regions, e.g., as described in U.S. patent Publication No. 2003-00779, dated Apr. 24, 2003, the complete disclosure of which is incorporated herein by reference. The outer surface 122 of the inner fabric layer 120 may be flat or smooth, or may be a raised fleece. Alternatively, in other embodiments, the inner surface 121 may be raised or it may be covered with velour at a predetermined pile height, or covered with shearling, loop terry, or the like. During use, the fibers of the discrete pillar regions 126 are disposed in contact the wearer's skin, and the base surface regions 128 of the channels 130, 135 of the inner surface 121 are spaced from contact with the wearer's skin. The plurality of intersecting channels 130, 135 define insulation regions that contain a cushion of air for promoting warmth under static conditions during periods of wearer inactivity and define circulation regions that create avenues for flow of air and enhanced evaporation of moisture from the skin of the wearer for creating a heat dissipation or cooling effect during periods of physical activity by the wearer.

The horizontal channels 130 of the inner surface 121 can be created in various different ways. For example, loop yarns can be removed from one or more of the feeds during knitting. As a result, yarn is excluded from preselected regions of the inner fabric layer 120 and channels 130 are created. As another example, a shrinkable loop yarn can be used in those areas where horizontal channels 130 are desired. Processing the fabric with wet heat (e.g., hot water or steam) or dry heat (e.g., hot air) causes the shrinkable yarn to shrink, creating channels 130. Vertical channels 135 can, for example, be formed by using tipped and tipless sinkers, high and low sinkers, or some combination of both. Other suitable methods are also contemplated.

The degree of thermal insulation and/or heat dissipation desired is a function of anticipated external conditions, e.g. of temperature and wind speed, and the expected level of physical exertion by the wearer. The level of thermal insulation and heat dissipation provided by the upper portion 105 of multi-layer composite fabric garments, in part, is a function of the cross-sectional flow area of the channels 130, 135. For example, as the cross-sectional area (e.g., the depth and/or width) of channels 130, 135 is increased, a greater volume of air can be contained within the channels. Thus, larger channels allow the upper portion 105 of garments 110, 100' to provide a relatively higher level of thermal insulation and heat dissipation. Similarly, smaller channels in the upper portion 105 of the garments provide a relatively lower level of thermal insulation and heat dissipation.

The cross-sectional area of channels 130, 135 can be altered in various ways. For example, regions 126 of raised fibers defining channels 130, 135 can be napped or brushed such that regions 126 become further raised to cause channels 130, 135 to take on greater depth. Napping and/or brushing regions 126 also makes the inner surface 121 of inner fabric layer 120 softer to the touch and enhances moisture absorption. With respect to horizontal channels 130 in particular, the loop yarn may be removed from greater or fewer feeds and/or more or fewer loops of shrinkable yarn can be used to alter the cross-sectional area of the channels 130. Similarly, with respect to vertical channels 135, the sinker height can be increased or decreased to produce channels that are deeper or shallower, respectively. Other suitable techniques for altering the size of channels 130, 135 are also contemplated.

In some embodiments, inner fabric layer 120 is rendered hydrophilic to promote transport of moisture through the fabric. Thus, during use, liquid moisture, e.g., sweat, is transported through the hydrophilic inner fabric layer 120 by capillary action. As discussed above, inner fabric layer 120 may be configured to transport moisture away from the wearer's skin and toward the intermediate barrier 125. (The moisture is subsequently transported through the barrier to the outer fabric layer 115, where it is absorbed and/or spread towards the surface for evaporation, as described in more detail below.) This arrangement helps to resist build up of moisture on the wearer's skin, and thus further increases the comfort level of the wearer.

Various techniques can be used to render the inner fabric layer 120 hydrophilic. For example, inner fabric layer 120 may be chemically treated, e.g. as described in U.S. Pat. No. 5,312,667, the complete disclosure of which is incorporated herein by reference. In particular, a material such as low molecular weight polyester can be added to a dye bath used to dye the inner fabric layer 120.

Referring again to FIG. 3, the outer fabric layer 115 may be a woven, two-way stretch material. Other suitable materials may also be employed alone or in various combinations. In some embodiments, outer fabric layer 115 is formed from a moisture absorbent material, such as cotton, rayon, or wool. Thus, during use, moisture is transported away from the inner fabric layer 120 and absorbed by the outer fabric layer 115.

In other embodiments, the outer fabric layer 115 alternatively may be formed of synthetic material, such as polyester, that has been rendered hydrophilic to help promote transport of moisture through the outer fabric layer 115. In these embodiments, liquid moisture is transported to the surface of the hydrophilic outer fabric layer 115 by capillary action after passing through barrier layer 125. Liquid moisture evaporates relatively rapidly from the surface of outer fabric layer 115, thus this arrangement increases the rate at which moisture is evaporated from outer layer 115, thereby increasing the rate at which moisture or sweat is removed from the region in contact with the wearer's skin.

In still other embodiments, the outer fabric layer 115 is formed from both moisture absorbent materials and materials that have been rendered hydrophilic. As a result, moisture is both absorbed by the outer fabric layer 115 and transported to the surface of outer fabric layer 115 by capillary action.

Still referring to FIG. 3, the barrier layer 125 is positioned between the inner and outer fabric layers 120, 115. Barrier layer 125 is windproof and water-resistant. Thus, barrier layer 125 helps to provide upper portion 105 with wind and liquid water resistance, as well as limited levels of vapor permeability, i.e., breathability. In other words, barrier layer 125 substantially restricts air and liquid water droplets from passing inwardly through the barrier layer toward the wearer's skin, but water vapor, e.g. sweat, is allowed to pass outwardly through barrier layer 125 for enhanced wearer comfort.

Breathability can be imparted to barrier layer 125 by forming the barrier layer to be sufficiently thin so as to permit water vapor to pass through the layer, as by an absorption-diffusion-desorption process in polyurethane barrier materials, or by providing material with micro-pores for the passage of water vapor. As described in U.S. Pat. Nos. 5,204,156, 5,268,212, and 5,364,678, the complete disclosures of all of which are incorporated herein by reference, barrier layer 125 may be formed of any of various water resistant materials. For example, barrier layer 125 may be formed from aromatic or aliphatic polyurethane. A suitable polyurethane material is available from UCB Chemical Corp., located in Drogenbos, Belgium. A micro-porous hydrophobic film, permeable to water vapor but impermeable to liquid water can also be used. Barrier layer 125 can be formed to be soft, with an ability to stretch and recover. In some cases, barrier layer 125 is formed of a material that adheres to fabric layers without application of an intervening adhesive layer.

Material used to form barrier layer 125 may also advantageously contain various useful additives. For example, the material may contain polyfunctional isocyanate to promote cross-linking, melamine to promote adhesion, aliphatic polyarnine to catalyze curing, and/or fluorocarbon resin to enhance water repellency.

A well-suited barrier can be formed from hydrophilic polyurethane derived from a solvent-based system, which permits moisture to pass through the barrier by an absorption-diffusion-desorption process. Such a polyurethane barrier is non-porous and formed so that body moisture will be transported therethrough, while being sufficiently resistant to passage of water droplets.

The thickness of barrier layer 125 is selected to balance its properties of liquid water resistance and vapor permeability. Typically, liquid water resistance of barrier layer 125 increases with thickness and vapor permeability of the barrier layer decreases with thickness. In some embodiments, the barrier layer 125 may be formed to be relatively thicker so as to increase liquid water resistance. In other embodiments, the barrier layer may be formed to be relatively thinner so as to increase its vapor permeability.

In addition, barrier layer 125 can be partially hydrophobic, in that there are fewer pores/$mm^2$ than in a true hydrophobic barrier. Thus, moisture can pass through the hydrophilic portion of the barrier layer by an absorption-diffusion-desorption process and through micropores of the hydrophobic portion.

Various suitable techniques may be used to adhere the barrier layer 125 to the inner and/or outer fabric layers 120, 115. For example, still with reference to FIG. 3, barrier layer 125 may be adhered to the inner and outer fabric layers 120, 115 using the process of transfer coating. In particular, the barrier layer is formed on a carrier, such as release paper, and then the exposed surface of barrier layer 125 is joined to one of the inner and outer fabric layers 120, 115. At this point, the carrier is removed from the barrier layer, and the other of the inner and outer fabric layers 120, 115 is adhered to the opposite surface of barrier layer 125, without additional adhesive, to form the multi-layer composite fabric of which of upper portion 105 of garment 100 is constructed.

In some embodiments, as described below, the barrier layer is adhered to the inner and outer fabric layers 120, 115 by an adhesive applied in a continuous or discontinuous layer. The adhesive may be hydrophilic or hydrophobic material. The barrier layer can also be adhered to the fabric layers 120, 115 by other methods, such as using heat or pressure.

Figure 5:
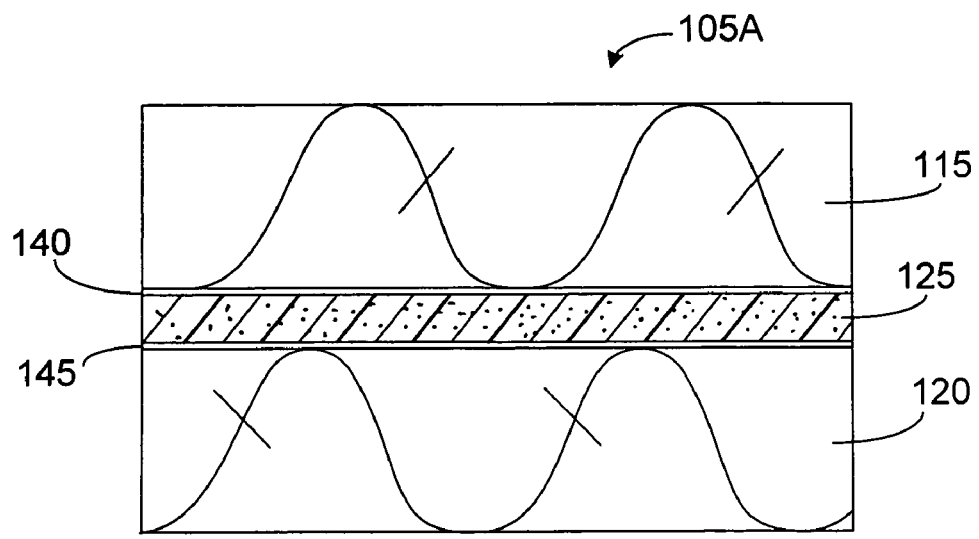
FIGS. 5, 6 and 7 are cross-sectional views of examples of multi-layer composite fabrics for use in an upper portion of multi-layer composite fabric garments of the invention.

Referring to FIG. 5, in another embodiment of a multi-layer composite fabric for use in an upper portion 105A of garments 100, 100' described herein, adhesive layers 140, 145 secure barrier layer 125 to opposed surfaces of the outer fabric layer 115 and inner fabric layer 120. The adhesive layers 140, 145 can be applied to opposed, unraised surfaces of the inner and outer layers 120, 115 and/or to the barrier layer 125 before joining layers 120, 115 together. Application of the adhesive may be by means of gravure printing or by another suitable application process. The adhesive layers 140, 145 may be formed of any of various suitable materials. For example, in some embodiments, adhesive layers 140, 145 are water resistant. One example of a suitable material for the adhesive layers is solvent-based polyurethane, such as Ucecoat TD9607, manufactured by UCB Chemical Corp.

Figure 6:
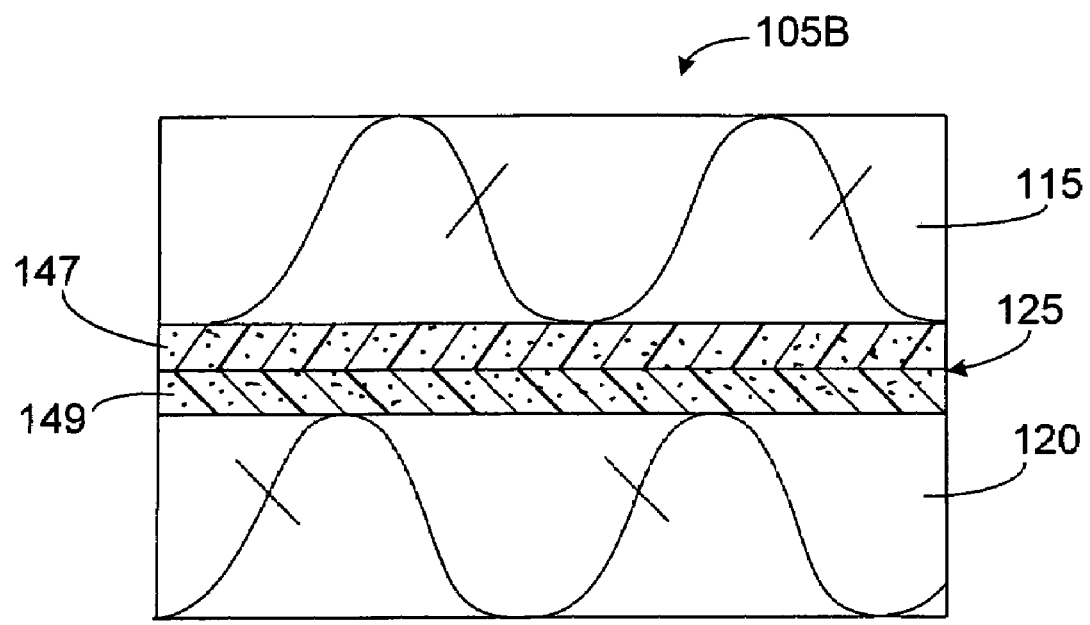

Referring next to FIG. 6, in other embodiments of a multi-layer composite fabric for use in an upper portion 105B of garments 100, 100' described herein, the barrier layer 125 includes first and second sub-barrier layers 147, 149. The first sub-barrier layer 147 is adhered to a surface of outer fabric layer 115, and the second sub-barrier layer 149 is adhered to a surface of inner fabric layer 120. Sub-barrier layers 147, 149 are adhered to inner and outer fabric layers 120, 115 using any of the techniques described above. The sub-barrier layers are also adhered to one another. The sub-barrier layers can be joined together, for example, by heat and/or pressure. They can also be adhered to one another with adhesive or by any other suitable means. For example, according to one method of constructing an upper portion 105 as shown in FIG. 6, each of the sub-barrier layers 147, 149 is laid on a carrier, such as release paper. The first sub-barrier layer 147 is transferred from its carrier to the surface of outer fabric layer 115, and the second sub-barrier layer 149 is transferred from its carrier to the surface of inner fabric layer 120. This method, referred to as transfer coating, is advantageous because it allows for precise control of barrier weight and thickness and allows use of thinner and lighter barrier layers. Sub-barrier layers 147, 149 are then adhered to each other, as shown.

Figure 7:
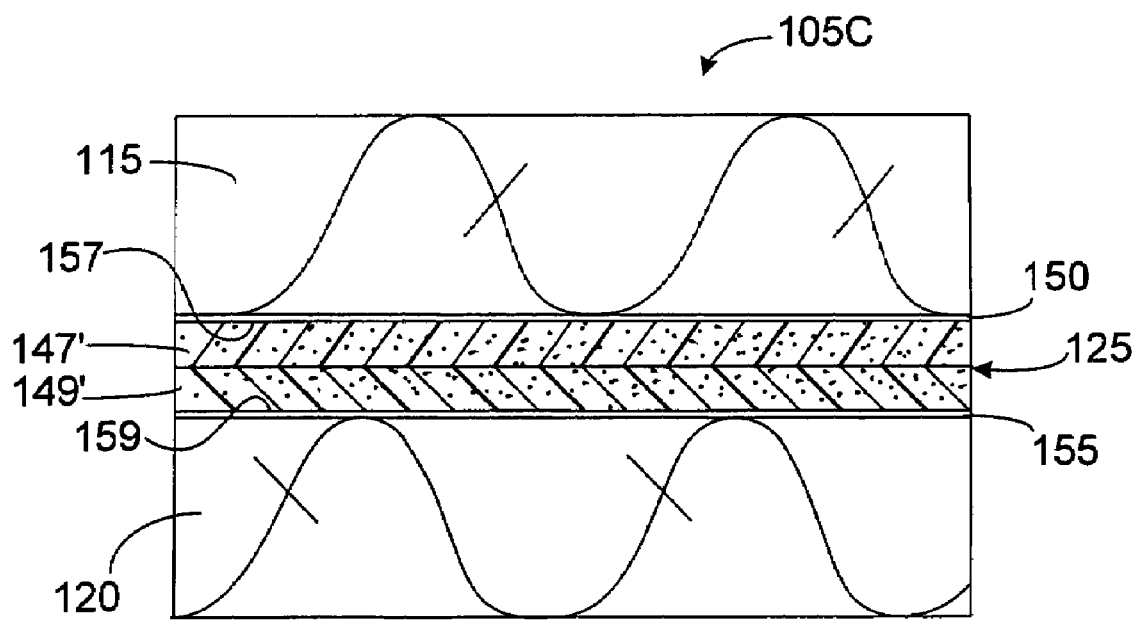

Referring next to FIG. 7, in still another embodiment of a multi-layer composite fabric for use in an upper portion 105C of garments 100, 100' described herein, first sub-barrier layer 147' is adhered to a surface 157 of outer fabric layer 115 by a first adhesive layer 150. Similarly, second sub-barrier layer 149' is adhered to a surface 159 of inner fabric layer 120 by a second adhesive layer 155. In some embodiments, adhesive layers 150, 155 are continuous and formed of hydrophilic material. In other embodiments, one or both of the adhesive layers are formed of micro-porous hydrophobic material. In the latter embodiments, adhesive layers 150, 155 are preferably discontinuous. As a result of any of the various barrier layer configurations described above, limited amounts of water vapor can be transported through adhesive layers 150, 155.

The composite fabric of FIG. 7 may be constructed by laying each of the sub-barrier layers 147', 149' on a carrier sheet. First sub-barrier layer 147 is transferred directly to the first adhesive layer 150, and second sub-barrier layer 149 is transferred directly to the second adhesive layer 155. The sub-barrier layers are then adhered to each other by heat and/or pressure, for example, to form the composite fabric shown in FIG. 7.

Other multi-layer composite fabric constructions and arrangements using these and other material for creating in garments of the invention will also be apparent from the examples provided above.

Lower Portions of the Garments

As discussed above, the lower portions 110, 110' of the multi-layer composite fabric garments 100 (shown in FIG. 1) and 100' (shown in FIG. 2) are constructed to provide a relatively higher level of breathability, i.e. air permeability. For example, in the embodiment of FIG. 1, the lower portion 110, a laminate with inner and outer fabric layers disposed about an intermediate barrier layer, provides controlled air permeability in the range of about 0 CFM to about 20 CFM. By comparison, in the embodiment of FIG. 2, the lower portion 110', without an intermediate barrier layer, provides controlled air permeability in the range of about 0 CFM to about 60 CFM. In both embodiments, the lower portions 110, 110' include regions of the garments 100, 100' less likely (relative to the upper portion 105) to be exposed to wind and rain, so the lower portions 110, 110' are constructed in a manner to provide a high level of breathability and air permeability, and thus increase the comfort level of the wearer.

Figure 8A:
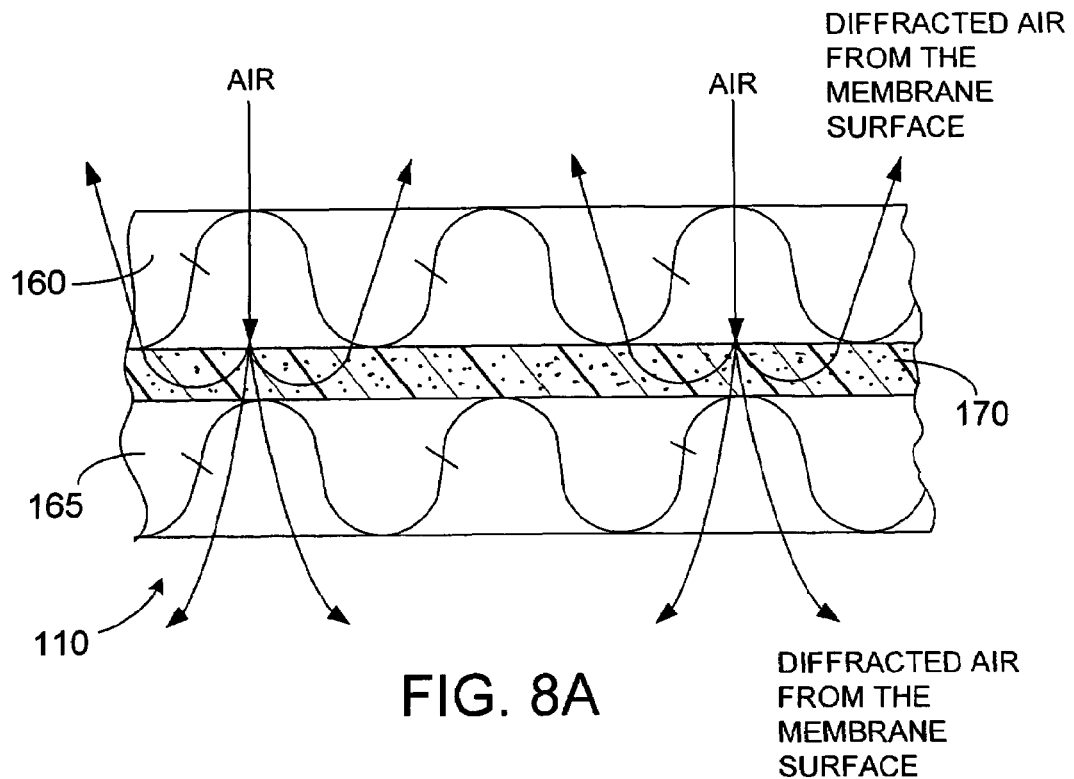
FIGS. 8A and 8B are cross-sectional views of examples of multi-layer composite fabrics for use in the lower portion of multi-layer composite fabric garments of the invention.

Referring to FIG. 8A (and also to FIG. 1), the composite fabric of the lower portion 110 of multi-layer composite fabric garment 100 has controlled air permeability in a construction consisting of an outer fabric layer 160, an inner fabric layer 165, and an intermediate barrier layer 170. During use, liquid moisture, e.g., sweat, is absorbed by the inner fabric layer 165 and transported through the barrier layer 170 to the outer fabric layer 160 where it is absorbed and/or evaporates. Due to the construction of the composite fabric 110, air is also permitted to penetrate through the fabric into contact with the wearer's skin, e.g. for cooling, including by direct evaporation of liquid moisture (sweat) from the wearer's skin, under certain conditions.

Figure 8B:
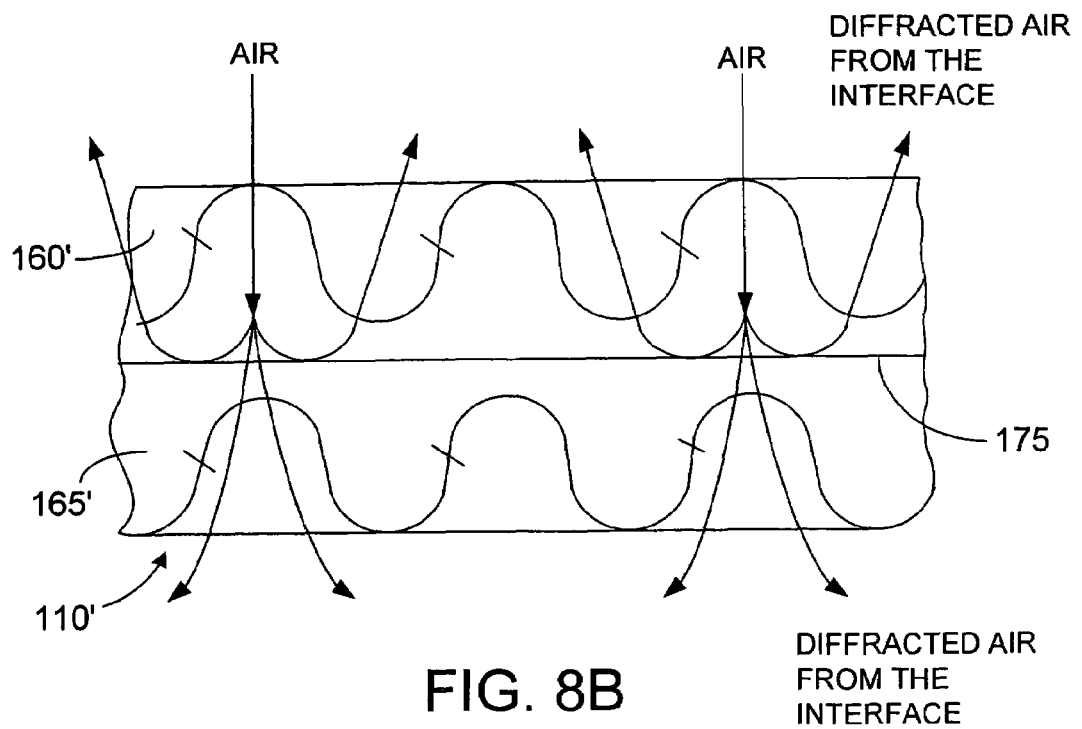

Referring to FIG. 8B (and also to FIG. 2), in another embodiment, the composite fabric of the lower portion 110' of multi-layer composite fabric garment 100' has controlled air permeability in a construction consisting of an outer fabric layer 160' and an inner fabric layer 165', without an intermediate barrier layer. As above, during use, liquid moisture, e.g., sweat, is absorbed by the inner fabric layer 165' and transported to the outer fabric layer 160' where it is absorbed and/or evaporates. Due to the construction of the composite fabric 110', i.e. absence of an intermediate barrier layer, air is permitted to penetrate more easily through the multi-layer composite fabric layer 110' for cooling and providing direct evaporation of liquid moisture (sweat) from the wearer's skin.

Referring still to FIGS. 8A and 8B, the barrier layer 170 between fabric layers 160, 165 of the multi-layer composite fabric of lower portion 110 and the tortuosity of interstitial spaces at the interface 175 between the fabric layers 160', 165' of the multi-layer composite fabric of lower portion 100' help to provide the lower portions 110, 110' with relatively higher levels of vapor permeability or breathability, as compared to the upper portion 105 (shown in FIG. 1).

The multi-layer composite fabric of the lower portions 110, 110' can be constructed to provide a desired level of breathability. As indicated by the arrows in FIGS. 8A and 8B, air impinging upon the lower portions 110, 110' is partially deflected, e.g., at the barrier layer 170 (FIG. 8A) or at the interface 175 (FIG. 8B), and partially penetrates through to the inner surface of the fabric.

In the absence of moving air, water vapor/moisture from the skin cannot be quickly transported through the fabric, which can lead to excessive build up of heat and moisture (sweat), in particular during strenuous exercise and/or warm conditions. When air is allowed to pass through the composite fabric, it facilitates more effective transfer of high moisture levels, and thus allows the wearer to be more comfortable.

As wind speed increases, more air flows through the barrier 170 or interface 175, allowing more water vapor to be dissipated. Thus, the lower portions 110, 110' have relatively higher water vapor permeability in moving air and relatively lower water vapor permeability in static air. As a result, the lower portions 110, 110' beneficially cool the wearer during periods of physical activity and warm the wearer during periods of inactivity.

The inner fabric layers 165, 165' are similar to the inner fabric layer 120 of the upper portion 105, as described above with respect to FIG. 4. In particular, in a preferred embodiment, the inner fabric layers 165, 165' have multiple intersecting channels defined by discrete raised pillar regions. As discussed above, the intersecting channels provide insulation regions that contain a cushion of air for promoting warmth under static conditions, i.e. during periods of wearer inactivity, and the channels provide circulation regions creating avenues for flow of air and enhanced evaporation of moisture from the skin of the wearer, providing a heat dissipation or cooling effect, i.e. during periods of physical activity by the wearer. In other embodiments, the inner surfaces of the inner fabric layers 165, 165' of lower portions 110, 110' may be finished with raised surfaces other than in a three-dimensional pattern with raised regions separated by channels, e.g. with velour at predetermined pile height, shearling, loop terry, etc.

The inner fabric layers 165, 165' can be treated or modified, e.g. as described in U.S. Pat. Nos. 5,204,156, 5,268,212, and 5,364,678. For example, inner fabric layers 165, 165' can be rendered hydrophilic, provided with a raised surface, treated to be water repellant, etc.

In some embodiments, the outer fabric layers 160, 160' are woven material, e.g. a two-way stretch woven material or a one-way stretch woven material, with one or more raised surface regions. In other embodiments, the outer fabric layers 160, 160' are knit material, e.g. a one-way stretch knit material. The outer fabric layers may also be treated or modified, including as described in U.S. Pat. Nos. 5,204,156, 5,268,212, and 5,364,678. By way of example, the outer fabric layers 160, 160' may be rendered hydrophilic, provided with a raised surface, treated to be water repellant, etc.

The barrier layer 170 of the multi-layer composite fabric of lower portion 110 can be of any material and/or configuration, e.g., as described in U.S. application Ser. No. 10/650,098, the complete disclosure of which is incorporated herein by reference. For example, referring again to FIG. 8A, the barrier layer 170 can be an adhesive. The adhesive can be polyurethane, polyester, acrylic, polyarnide, or a combination of these materials. The adhesive can, for example, be applied to the inner and/or outer fabric layers 165, 160 by means of transfer coating from release paper at between about 0.25 $oz/yd^2$ and about 2.5 $oz/yd^2$.

Figure 9:
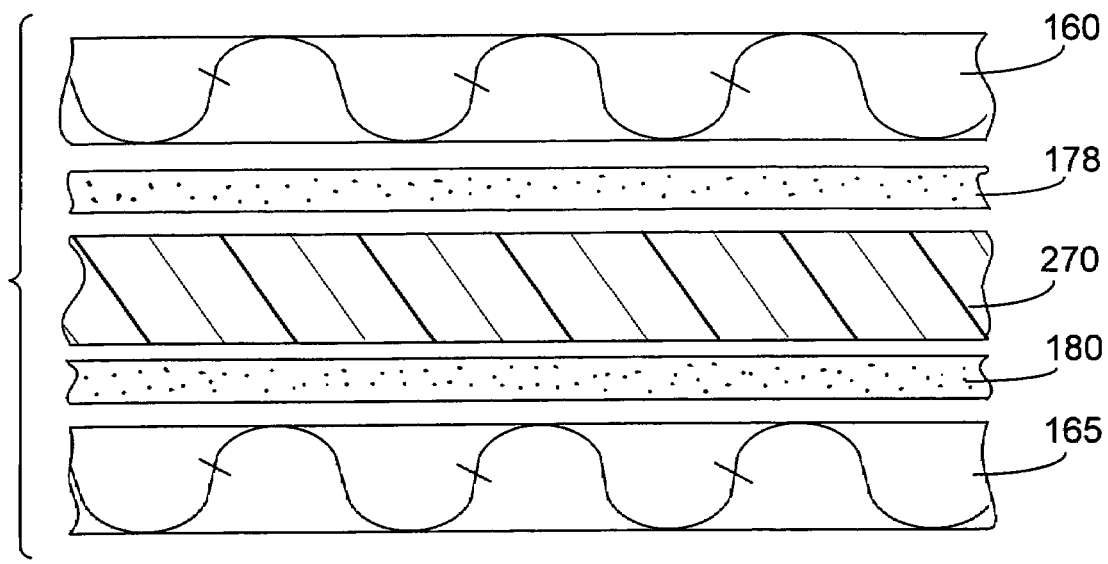
FIG. 9 is an exploded cross-sectional view of an example of a multi-layer composite fabric for use in the lower portion of multi-layer composite fabric garments of the invention.

Referring to FIG. 9, in another embodiment of a multi-layer composite fabric for use in a lower portion 110 of garments 100, 100' described herein, the lower portion 110 includes inner and outer fabric layers 165, 160, an intermediate barrier layer or membrane 270, and first and second adhesive layers 178, 180. The first adhesive layer 178 is positioned between the membrane 270 and the outer fabric layer 160 for adhering the membrane to the outer fabric layer. Similarly, the second adhesive layer 180 is positioned between the membrane and the inner fabric layer for adhering membrane 270 to inner fabric layer 165. The adhesive layers 178, 180 can, in one form, be applied by means of transfer coating from release paper at a thickness of between about 0.25 $oz/yd^2$ and about 2.5 $oz/yd^2$. Other suitable techniques may also be employed.

Membrane 270 can be formed from polyurethane, polytetrafluoroethylene or polyester. Adhesive layers 178, 180 can be applied to the membrane 270 by means of transfer coating from release paper at a thickness of between about 0.0001 inch and about 0.010 inch, or the adhesive layers can be applied directly onto the fabric surfaces at a thickness of between about 0.0003 inch and about 0.010 inch. The resulting composite fabric will have high moisture vapor transmission in both static conditions and in dynamic conditions, e.g. at about 10 CFM to about 100 CFM. In some preferred embodiments, the same or similar fabrics may be employed for the first inner layer and first outer layer of the upper portion of the composite fabric garment, with the first intermediate barrier layer of laminate film and adhesive constructed to permit a control degree of air permeability, e.g. at a selected level within the range of about 0 CFM to about 1.0 CFM, and the lower portion of the composite fabric garment can be constructed with little or no control, i.e. limit, on air permeability, permitting air flow in the range of about 0 CFM to about 100 CFM.

Figure 10:
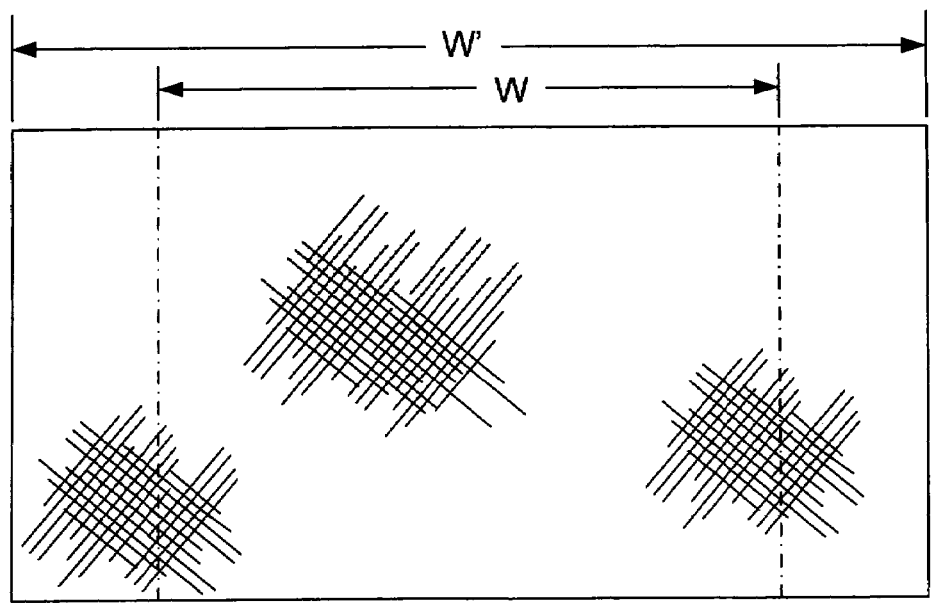
FIG. 10 is a top plan view after stretching of a multi-layer composite fabric for use in the lower portion of multi-layer composite fabric garments of the invention.

Referring now to FIG 10, a multi-layer composite fabric from which the lower portion 110 is constructed has an original width, W. The composite fabric is subjected to controlled stretching in such a manner as to result in a stretched width, W'. The composite fabric having the stretched width, W', provides a relatively higher level of air permeability. More specifically, as the composite fabric is stretched, the interstitial spaces between the yarns become larger, with resulting increase in air permeability. Thus, the composite fabric can be stretched to a point of providing a desired level of air permeability.

Figure 11:
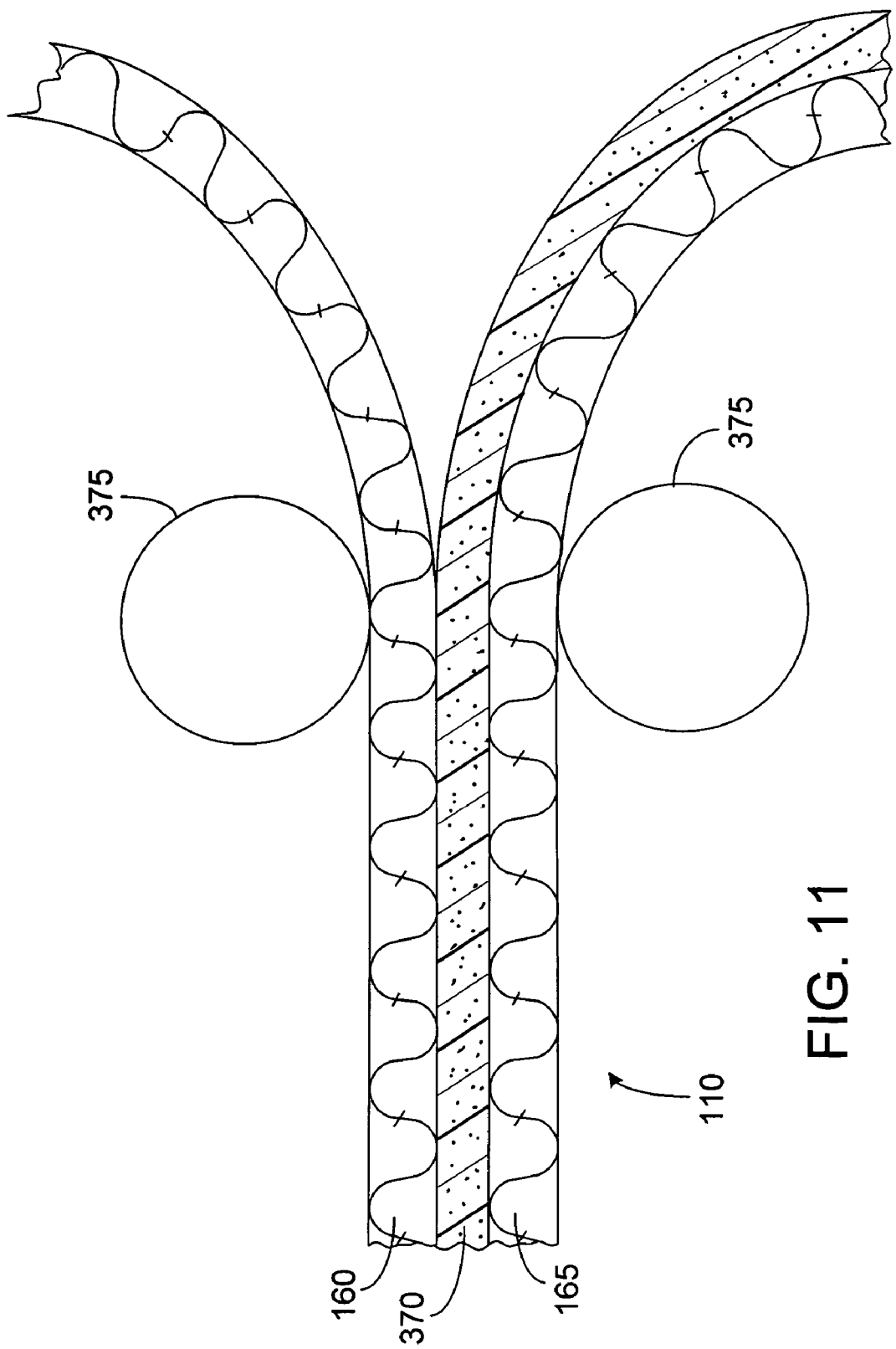
FIGS. 11 and 12 are somewhat diagrammatic representations of examples of processes for construction of multi-layer composite fabrics for use in the lower portion of multi-layer composite fabric garments of the invention.

Referring to FIG. 11, in another embodiment of a multi-layer composite fabric for use in a lower portion 110 of garments 100, 100' described herein, the lower portion 110 includes inner and outer fabric layers 165, 160 and an intermediate barrier layer of adhesive 370. The adhesive can be polyurethane, polyester, acrylic, polyarnide, or a combination of these materials. The adhesive can be applied as foam at between about 0.3 $oz/yd^2$ and about 10 $oz/yd^2$. The foam density (mixing air with adhesive) and the amount of adhesive applied can be selected in accordance with the desired air permeability of the lower portion. The lower portion is prepared by first applying the foam adhesive 370 upon one of the opposed surfaces of the inner and outer fabric layers 165, 160. Once applied, the other of the fabric layers 165, 160 is placed over the adhesive 370 in order to produce the composite fabric from which the lower portion 110 is constructed. The composite fabric is then mechanically processed through a pair of opposed rollers 375, which apply pressure in the range of about 10 $lbs/in^2$ to about 150 $lbs/in^2$ in order to produce a composite having the desired predetermined level of air permeability.

Figure 12:
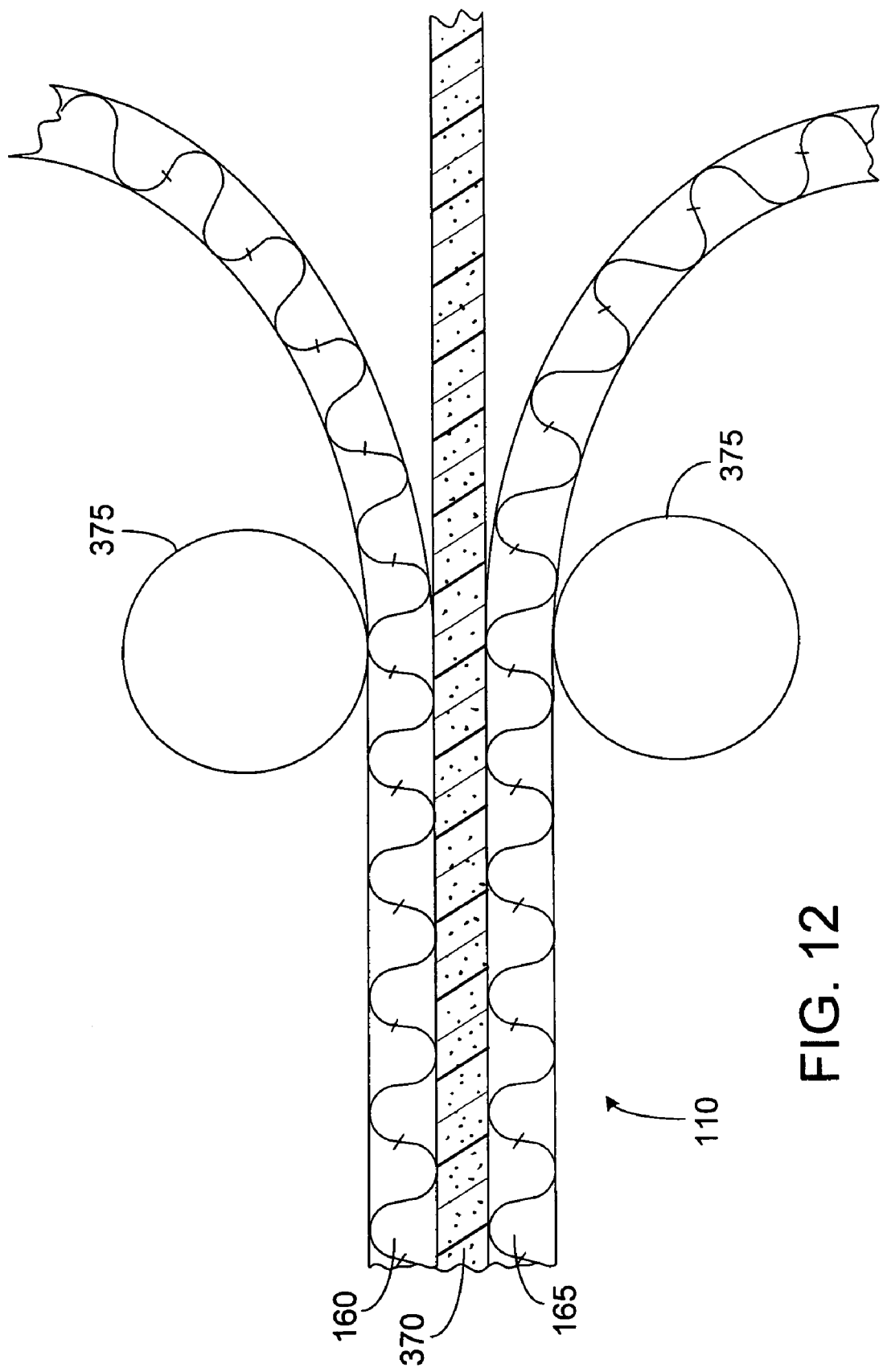

Referring next to FIG. 12, in still another embodiment of a multi-layer composite fabric for use in a lower portion 110 of garments 100, 100' described herein, the lower portion 110 consists of inner and outer fabric layers 165, 160 and intermediate adhesive layer 370. In this embodiment, the adhesive layer is concurrently attached to the inner and outer fabric layers 165, 160. Air permeability is controlled by application of mechanical processing, such as treatment with rollers 375, to the lower portion 110 in order to create desired levels of air permeability. Still referring to FIG. 12, the adhesive 370 is applied to the inner and outer fabric layers 165, 160 by means of a release paper. For example, adhesive 370 is first applied to the release paper at a thickness of between about 0.25 $oz/yd^2$ and 2.5 $oz/yd^2$, after which one of the fabric layers 165, 160 is placed upon the adhesive surface in order for bonding to occur. The release paper is then stripped from the adhesive layer and the other fabric layer is applied to the exposed surface of the adhesive. The composite then undergoes mechanical processing by rollers 275, which apply pressure to the composite fabric. In some embodiments, rollers 270 may be heated, e.g. to a temperature of between about 100° F. and about 375° F. As can be appreciated, changes in mechanical parameters (e.g., roller temperature, pressure applied, speed of the fabric through the rollers, etc.) can be employed to adjust air permeability characteristics of the composite fabric. Similarly, adhesive layer 370 can be applied directly to one or both of the fabric layers 165, 160 (at a thickness of about 0.25 $oz/yd^2$ to about 2.5 $oz/yd^2$) without the use of release paper. As discussed above, the composite fabric is then subjected to mechanical processing in order to achieve desired air permeability performance.

Again, other multi-layer composite fabric constructions and arrangements using these and other material for creating in garments of the invention will also be apparent from the examples provided above.

Outer Surface Coating

One or more regions of the outer surface of the multi-layer composite fabric garments 100, 100' may have a non-continuous protective coating applied thereon, e.g. for protection of the material surface from abrasion and pilling or fraying. For example, as described in application Ser. No. 10/700,405 and application Ser. No. 60/493,275, the complete disclosures of both of which are incorporated herein by reference, a non-continuous coating is adhered upon one or more selected regions of the relatively smooth outer surface of multi-layer composite fabric garments of the invention. The non-continuous outer surface coating enhances surface abrasion resistance and pilling resistance of the resulting fabric while allowing generation of controlled air permeability in a predetermined range to facilitate improved levels of moisture vapor transmission (MVT), which is particularly desirable for activities generating high metabolism rates.

Referring again to FIG. 1, in some embodiments, the elbow regions of the outer fabric layer 115 of the upper portion 105 are provide with a non-continuous coating 161, while the remaining regions of the outer fabric layer of the upper and lower portions 105, 110, 110' are left free of coating. In other embodiments, the non-continuous coating 161 may more typically be applied to multiple regions of the outer surface of the garment 100, 100' that are relatively more prone to abrasion and pilling or fraying during use, i.e. in addition to the elbow regions. Application of the non-continuous coating 161 provides the coated regions with relatively higher levels of abrasion and pilling resistance, e.g., as compared to uncoated regions, while those uncoated regions, being substantially free of coating material, have a relatively higher level of air permeability and facilitate a higher moisture vapor transmission rate.

In some embodiments, the outer fabric layers of the upper and lower portions 105, 110, 110' of the garments 100, 100' have one or multiple regions of non-continuous coating and one or multiple regions of continuous coating. The non-continuous coating is preferably applied to regions of the garments 100, 100' subjected to relatively high perspiration levels during use, e.g., the underarm regions. The non-continuous coating, by being applied to those regions that are subjected to relatively higher perspiration levels, permits relatively higher levels of airflow, which facilitates moisture vapor transmission, while still enhancing the resistance to abrasion and pilling. The continuous coating permits the remaining regions of the garments 100, 100' to be provided, e.g., with relatively higher abrasion and pilling resistances and relatively lower air permeability levels when desired. In some embodiments, the non-continuous coating may be applied or additionally applied in areas of the fabric article subjected to relatively high levels of wind impact (e.g., the chest of a shirt or jacket) to provide improved wind resistance due to the selected application of the coating material.

Figure 13:
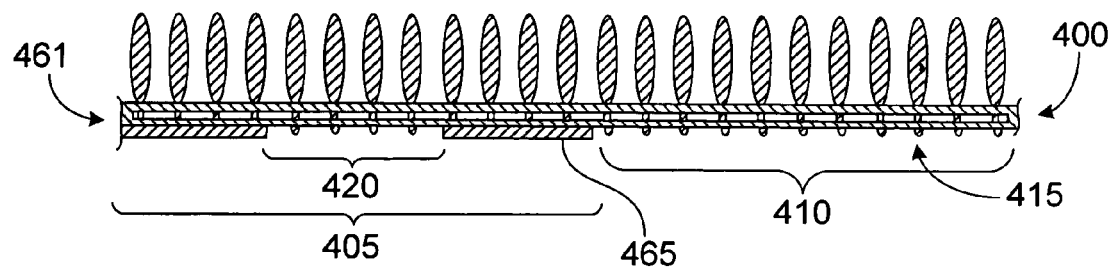
FIG. 13 is a somewhat diagrammatic cross-sectional view of an outer fabric layer of an example of a multi-layer composite fabric for use in the elbow regions of multi-layer composite fabric garments of the invention.

Referring to FIG. 13, a knit fabric 400 forming an outer fabric layer of the garments 100, 100' has a non-continuous coating 461 formed of multiple, spaced apart or discontinuous coating segments 465 applied within a first area 405 of the technical face, i.e., the outer surface of garments 100, 100'. The non-continuous coating 461 is applied to only portions of the knit fabric 400, leaving a second area 410 substantially free of the non-continuous coating 461. Alternatively, the second area 410 may have a continuous coating applied thereon. The non-continuous coating 461 within the first area 405 of the technical face 415 is applied in a predetermined pattern (e.g., lines, dots, etc.) leaving portion 420 of the technical face within the first area 405 adjacent the coating segments 465 free of coating material. The coating material forming the coating segments 465 is generally air impermeable or semi-impermeable, while within the portion 420, the fabric remains air permeable to allow air passage through the composite fabric at controlled rates, the details of which are further described below.

In addition to providing controlled air permeability, the coating material binds together yarn fibers to improve certain other structural and physical properties of the composite fabric. For example, the coating material, in binding together the individual fibers, forms bound fiber groupings (e.g., of at least about 5 fibers and up to about 100 fibers) and the tenacity of these groupings of fibers (e.g., from about 140 to about 350 grams per denier for a grouping of about 70 fibers) is greater than the tenacity of each individual fiber (e.g., from about 2 to about 5 grams per denier). Also, by coating and binding yarn fibers together within the first region 405, the abrasion and pilling resistances within the region of the composite fabric are improved. For example, pilling resistance within the coated regions of the composite fabric can be as high as five on a scale from one to five measured by ASTM D-3512. Face abrasion resistance of the composite fabric within the coated regions can be as high as five on a scale from one to five after 250 cycles measured by ASTM D-3884 and using a Martindale abrasion machine where the abrasion is done by a VELCRO® hook touch fastener tape mounted on the Martindale testing unit.

In binding together fibers of the yarn, the non-continuous coating 461 also provides greater freedom of yarn selection in the construction of the fabric. In some embodiments, the coating 461 facilitates use of relatively finer fibers (e.g., from about 5.0 dpf down to about 0.1 dpf) in the construction of the fabric, e.g., by reducing the risk of the fibers being pulled from the technical face. By utilizing relatively finer fibers, a tighter stitch can be achieved, which, in turn, improves the dynamic insulating performance of the resultant fabric by, e.g., providing relatively narrow air passageways through the fabric and increasing tortuosity through those passageways. In certain embodiments, the non-continuous coating 461, in binding fibers in the yarn of fabric 400, allows use of relatively weaker fibers, such as polyester and nylon, in construction of the fabric, which also provides greater tortuosity of air passageways to enhance dynamic insulation performance of the fabric.

A variety of coating materials can be used, including, e.g. acrylic (including acrylic latex), polyurethane and silicone. The coating can be selected to have a dry hand upon curing or drying, i.e. not tacky to the touch, good stretch/recovery, and good bond to textile fibers. The amount of coating material applied depends, at least in part, on the end use of the product. For example, in some cases, it may be desirable to greatly enhance the abrasion resistance of areas of the fabric. In these cases, relatively more coating material can be applied (e.g., more dots per square inch of fabric material and/or more material per dot). In other cases, it may be desirable for areas of the fabric article to have enhanced abrasion resistance, while having a relatively high level of air permeability. In these cases, relatively less coating material can be applied (e.g., less dots per square inch of material and/or less material per dot). The weight of the non-continuous coating 461 on the printed fabric can be between about 0.5 oz/yd$^3$ to about 6.0 oz/yd$^3$, and preferably is about 1.7 oz/yd$^3$. The non-continuous coating 461 can be applied by any suitable method including, e.g., rotary printing, kiss rolling, and gravure rolling. In some cases, the non-continuous coating 461 is applied by a single head rotary screen having a selected number of holes per lineal inch (e.g., from about 30 holes per lineal inch to about 195 holes per lineal inch).

Figure 14:
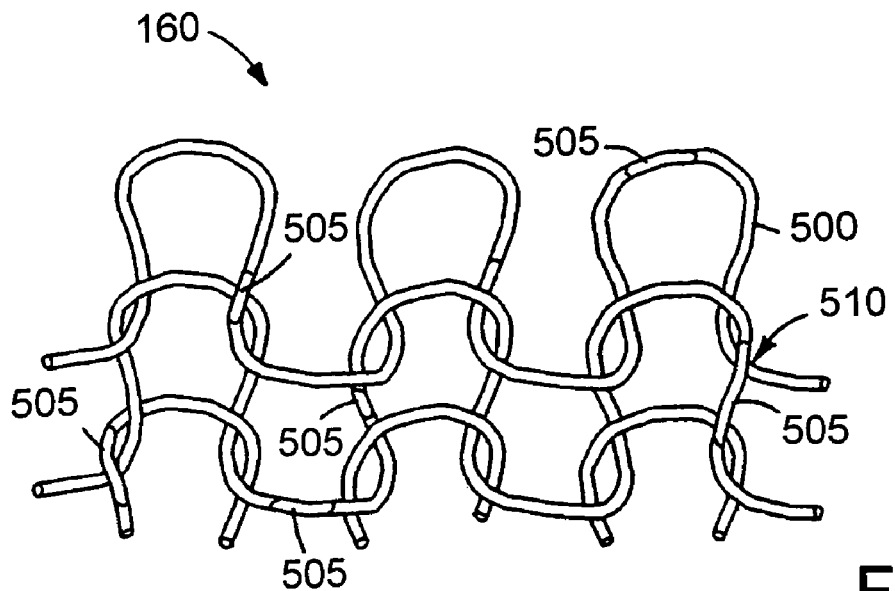
FIG. 14 is a somewhat diagrammatic plan view of the outer fabric layer of an example of a multi-layer composite fabric, with a binder material adhered to yarns and yarn fibers of the outer surface (for enhanced surface durability against pilling or fraying), for use in the elbow regions of multi-layer composite fabric garments of the invention.

In some embodiments, coating or binder may be applied to yarns of the outer fabric surface of the garments 100, 100' in different configurations. For example, referring to FIG. 14, regions 505 of binder or coagulant material are adhered primarily to yarn fibers 500 and at interlacing intersections of yarns 510, thereby allowing the fabric to retain its original form and characteristics, including good drapability and hand, and allowing through-passage of air to a predetermined degree (MVT and breathability), but also providing an outer surface of enhanced durability, e.g. against pilling and wear, e.g. during exercise and harsher outdoor sports.

Figure 15:
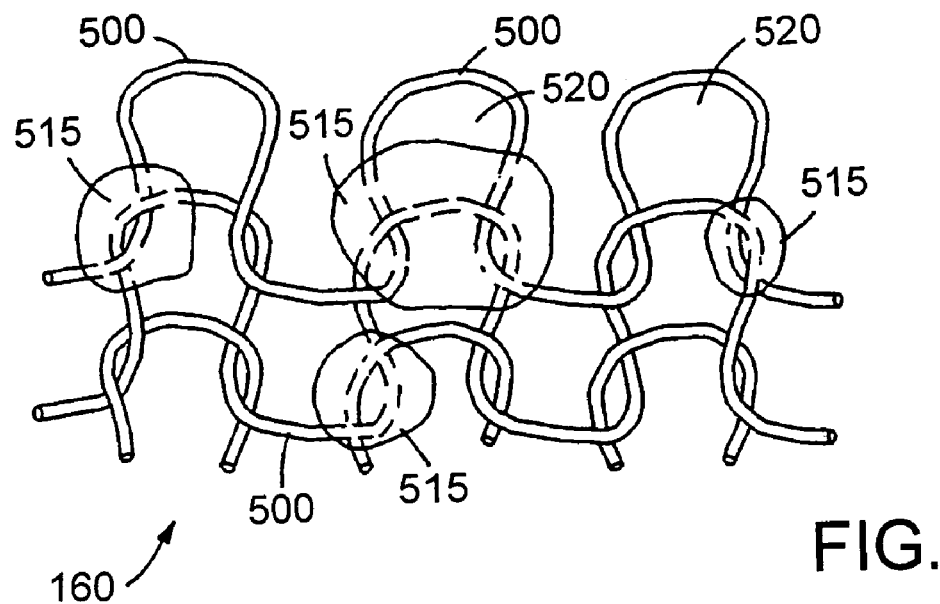
FIG. 15 is a somewhat diagrammatic plan view of the outer fabric layer of an example of a multi-layer composite fabric, with a binder material adhered to yarns and yarn fibers (for enhanced surface durability against pilling or fraying) and extending into interstitial spaces (to increase wind resistance of the composite fabric), for use in the elbow regions of multi-layer composite fabric garments of the invention.

Referring next to FIG. 15, in other embodiments, as described more fully below, the binder material forms a film 515 that constricts (but preferably does not block) interstitial spaces 520 between yarns 500, to reduce air-permeability and provide increased insulation and warmth, for use in particular under colder and windier conditions.

In some embodiments, the binder or coating for forming a surface region of enhanced durability surface is applied to the outer surface of garments 100, 100' with a pad. In order to reduce the tendency toward fraying while maintaining a high level of moisture vapor transmission, good drapability, hand and soft touch, deposit of the binder material is limited primarily to the fibers and/or to the intersections of fibers in the yarn segments, and formation of binder film in the interstitial spaces between yarns is minimized. The formation of film may particularly be avoided by removal of excess liquid binder from interstitial spaces between yarns shortly following application, e.g. while the binder material is still wet or moist, by air suction or air blowing through the fabric article.

The binder material can be applied in a low viscosity system, or in a system with relatively low level of binder solids or particulates in a liquid carrier, so that as the system dries, the liquid carrier evaporates (or in a foam system, collapses), leaving the solid binder deposited primarily or only on the yarns or yarn fibers. In this manner, the air permeability level and other characteristics of the base fabric are maintained.

In other embodiments, binder or coating material of relatively higher viscosity may be employed, to encourage formation of a fine film in interstitial areas between yarns that will partially or fully maintain its integrity during the drying process. In this manner, the fabric article may be provided with increased water repellency and wind resistance, which would be advantageous in cold windy ambient environments. However, a full or continuous film is typically to be avoided, in order to maintain at least a minimum desired degree of moisture vapor transmission necessary for comfort during high energy activities, such as running, skiing, etc.

The improved surface durability of multi-layer composite fabric articles of the invention is demonstrated in a severe pilling and abrasion test, such as the modified Martindale abrasion test method of ASTM D 4966. According to this test method, a fabric article of the invention to be tested is subjected to repeated rubbing by a strip of the hook element (General Application type, ¾-inch by ½-inch) of a hook-and-loop type fastener element. After 250 rubs, the appearance of the fabric article of the invention has been seen to be markedly better, e.g., as compared to untreated fabric articles.

A number of embodiments of the invention have been described. Nevertheless, it will be understood that various modifications may be made without departing from the spirit and scope of the invention. For example, in other embodiments, raised regions 126 of the inner surfaces of the upper portion 105 and lower portions 110, 110' of garments of the invention can be formed to define channels of other, different arrangements, e.g., raised regions 126 may define horizontal channels alone, vertical channels alone, zig-zag channels, arcuate channels, or channels of any other desired shape or configuration capable of providing a cushion of air within the channels and/or permitting circulation of air through the channels. Accordingly, other embodiments are within the scope of the following claims.

What is claimed is:

1. A composite fabric garment having an upper region that is relatively more likely in use to be exposed to wind and rain, and a lower region that is relatively less likely in use to be exposed to wind and rain, the garment comprising:
   a first garment portion, forming the upper region, wherein said first garment portion is formed of a first composite fabric comprising:
     a first inner fabric layer;
     a first outer fabric layer; and
     a first intermediate barrier layer disposed between and bonded to at least one of said first inner fabric layer and said first outer fabric layer, said first intermediate barrier layer being breathable and substantially impermeable to wind and liquid water; and
   a second garment portion forming the lower region, wherein said second garment portion is formed of a second composite fabric having predetermined air permeability and comprising:
     a second inner fabric layer; and
     a second outer fabric layer,
   wherein said second garment portion has no intermediate barrier layer and has a relatively higher level of breathability and air permeability than said first garment portion.

2. The composite fabric garment of claim 1, wherein said one or more lower regions of said fabric garment include a wearer's lower chest region and below.

3. The composite fabric garment of claim 1, wherein at least one of the first inner fabric layer and the second inner fabric layer comprises yarn with a plurality of synthetic fibers rendered hydrophilic.

4. The composite fabric garment of claim 3, wherein the synthetic fibers of at least one of the first inner fabric layer and the second inner fabric layer are selected from the group consisting of polyester and nylon.

5. The composite fabric garment of claim 1, wherein the first inner fabric layer is hydrophilic.

6. The composite fabric garment of claim 1 or claim 5, wherein the first outer fabric layer is hydrophobic.

7. The composite fabric garment of claim 1, wherein at least one of the first inner fabric layer and the second inner fabric layer defines a surface comprising discrete pillar regions of relatively deeper pile, said discrete pillar regions of relatively deeper pile being spaced apart and isolated from each other by regions of relatively shorter pile or no pile that form a plurality of channels passing among said discrete pillar regions, said plurality of channels defining insulation regions to contain a cushion of air for promoting warmth under static conditions during periods of wearer inactivity and defining circulation regions creating avenues for flow of air and enhanced evaporation of moisture from the skin of the wearer for creating a heat dissipation or cooling effect during periods of physical activity by the wearer.

8. The composite fabric garment of claim 7, wherein the plurality of channels formed along at least one of the first inner fabric layer and the second inner fabric layer comprises a plurality of intersecting vertical and horizontal channels.

9. The composite fabric garment of claim 8, wherein the vertical channels formed along at least one of the first inner fabric layer and the second inner fabric layer are constructed by tipped and tipless sinkers, high and low sinkers, or a combination thereof.

10. The composite fabric garment of claim 1, wherein at least one of the first outer fabric layer and the second outer fabric layer comprises a knit construction of multi-filament, interlaced yarns with one or more outer surface regions having a non-continuous coating comprising discrete coating segments of coating material applied to bind individual yarn fibers together for enhanced resistance of the outer surface region to abrasion, pilling or fraying.

11. The composite fabric garment of claim 1, wherein at least one of the first inner fabric layer and the second inner fabric layer has a raised surface in a form selected from the group consisting of: velour, shearling, and loop terry.

12. The composite fabric garment of claim 1, wherein at least one of the first outer fabric layer and the second outer fabric layer has a construction selected from the group consisting of: woven construction, circular knit construction, single face knit construction, double face knit construction, and warp knit construction.

13. The composite fabric garment of claim 12, wherein at least one of the first outer fabric layer and the second outer fabric layer has at least one-way stretch.

14. The composite fabric garment of claim 13, wherein at least one of the first outer fabric layer and the second outer fabric layer has two-way stretch.

15. The composite fabric garment of claim 12, claim 13 or claim 14, wherein at least one of the first outer fabric layer and the second outer fabric layer has a raised surface in one or more regions.

16. The composite fabric garment of claim 12, claim 13 or claim 14, wherein at least one of the first outer fabric layer and the second outer fabric layer has an unraised surface in one or more regions.

17. The composite fabric garment of claim 1, wherein, in the upper portion of the composite fabric garment, at least the outer layer has a construction with minimal seams for improved resistance to penetration of water.

18. The composite fabric garment of claim 1, wherein at least one of the first outer fabric layer and the second outer fabric layer comprises a fabric of knitted or woven construction of multi-filament, interlaced yarns with one or more outer surface regions having a non-continuous coating of binder material adhered to yarns and to yarn fibers at least at interlacing intersections for enhanced durability of the outer surface region to pilling or fraying.

19. The composite fabric garment of claim 18, wherein adhering of the binder material to yarn fibers is limited in a manner to substantially avoid restriction of air permeability through the second composite fabric article.

20. The composite fabric garment of claim 1, wherein the first inner fabric layer comprises a raised inner surface and a plain outer surface, the first inner fabric layer being formed of essentially hydrophobic material rendered hydrophilic to permit wicking of moisture from the raised inner surface to the plain outer surface, and wherein the first intermediate barrier layer comprises a first hydrophilic layer bonded to at least one of the first inner fabric layer and the first outer fabric layer, the first intermediate barrier layer permitting moisture vapor transmission.

21. The composite fabric garment of claim 1, wherein the first inner fabric layer comprises a raised inner surface and a plain outer surface, the first inner fabric layer being formed of essentially hydrophilic material to permit wicking of moisture from the raised inner surface to the plain outer surface, and wherein the first intermediate barrier layer comprises a non-porous hydrophilic layer, the first intermediate barrier layer permitting water vapor transport, and wherein a first hydrophilic adhesive layer affixes the first intermediate barrier layer to at least one of an outer surface of the first inner fabric layer and an inner surface of the first outer fabric layer.

22. The composite fabric garment of claim 1, wherein said second garment portion has a construction selected from the group consisting of: woven construction, circular knit construction and warp knit construction, with predetermined air permeability achieved in a non-laminate absent an intermediate barrier.

23. The composite fabric garment of claim 22, wherein said predetermined air permeability is in the range of about 10 CFM to about 100 CFM.

24. The composite fabric garment of claim 1, wherein said predetermined air permeability is in the range of about 10 CFM to about 100 CFM.

25. The composite fabric garment of claim 1, wherein said second garment portion consists of:
a second inner fabric layer; and
a second outer fabric layer.

26. The composite fabric garment of claim 1, wherein said second garment portion has relatively higher water vapor permeability in moving air and relatively lower water vapor permeability in static air.

27. The composite fabric garment of claim 1, wherein the second garment portion comprises a woven second outer fabric layer, and the second garment portion has an air permeability of about 0 CFM to about 60 CFM.

28. The composite fabric garment of claim 1, wherein the second garment portion comprises a fabric selected from the group consisting of: single face knit construction and double face knit construction.

* * * * *

UNITED STATES PATENT AND TRADEMARK OFFICE
CERTIFICATE OF CORRECTION

PATENT NO. : 7,560,399 B2 Page 1 of 1
APPLICATION NO. : 10/960402
DATED : July 14, 2009
INVENTOR(S) : Rock et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (138) days Delete the phrase "by 138 days" and insert -- by 65 days --

Signed and Sealed this

Nineteenth Day of January, 2010

David J. Kappos
*Director of the United States Patent and Trademark Office*